United States Patent
Sato

(10) Patent No.: US 11,340,140 B2
(45) Date of Patent: May 24, 2022

(54) ABNORMALITY SIGN NOTIFYING SYSTEM, ABNORMALITY SIGN NOTIFYING METHOD, AND PROGRAM

(71) Applicant: TOYOTA JIDOSHA KABUSHIKI KAISHA, Toyota (JP)

(72) Inventor: Shun Sato, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 396 days.

(21) Appl. No.: 16/185,593

(22) Filed: Nov. 9, 2018

(65) Prior Publication Data

US 2019/0145863 A1 May 16, 2019

(30) Foreign Application Priority Data

Nov. 15, 2017 (JP) .............................. JP2017-220039

(51) Int. Cl.
*G01M 99/00* (2011.01)
*G01M 13/04* (2019.01)

(52) U.S. Cl.
CPC .......... *G01M 99/005* (2013.01); *G01M 13/04* (2013.01)

(58) Field of Classification Search
CPC .................................................. G01M 99/005
See application file for complete search history.

(56) References Cited

U.S. PATENT DOCUMENTS

| | | | | |
|---|---|---|---|---|
| 2001/0047691 A1* | 12/2001 | Dzenis | ................... | G01N 29/40 73/587 |
| 2004/0128067 A1* | 7/2004 | Smith | .................. | G08G 1/0962 701/516 |
| 2012/0239716 A1* | 9/2012 | Murray | ................. | G06F 15/025 708/160 |
| 2017/0031335 A1* | 2/2017 | Sakakibara | ............ | G05B 15/02 |
| 2017/0153625 A1* | 6/2017 | Yamamoto | ............ | B25J 9/1674 |
| 2017/0185970 A1 | 6/2017 | Nakazato | | |

FOREIGN PATENT DOCUMENTS

| | | |
|---|---|---|
| CN | 106919141 A | 7/2017 |
| CN | 107291830 A | 10/2017 |
| JP | 2011-059873 A | 3/2011 |
| JP | 2016-212642 A | 12/2016 |

\* cited by examiner

*Primary Examiner* — Matthew G Marini
(74) *Attorney, Agent, or Firm* — Sughrue Mion, PLLC

(57) ABSTRACT

A data storage unit 212 stores a plurality of pieces of abnormality data corresponding to operation state data of at least a robot in which an abnormality occurred in the past in association with environmental information and usage mode information. An abnormality data selection unit 218 narrows down the plurality of pieces of abnormality data stored in the data storage unit 212 to one or more pieces of the abnormality data based on the environmental information of a target robot and usage mode information of the target robot to select the abnormality data. A timing setting unit 220 sets a timing for notifying the abnormality sign based on the selected abnormality data and the operation state data corresponding to the selected abnormality data of the target robot. A notifying unit 126 notifies the abnormality sign related to the target robot at the timing set by the timing setting unit 220.

14 Claims, 14 Drawing Sheets

| 1 | ABNORMALITY DATA A | ABNORMALITY MODE A | OPERATION STATE DATA #4 | 0.98 |
|---|---|---|---|---|
| 2 | ABNORMALITY DATA A | ABNORMALITY MODE A | OPERATION STATE DATA #2 | 0.88 |
| 3 | ABNORMALITY DATA B | ABNORMALITY MODE B | OPERATION STATE DATA #2 | 0.74 |
| 4 | ABNORMALITY DATA C | ABNORMALITY MODE C | OPERATION STATE DATA #3 | 0.72 |
| ⋮ | ⋮ | ⋮ | ⋮ | ⋮ |

Fig. 7

| ENVIRONMENT | SPEED REDUCER TEMPERATURE | NO CHARACTERISTIC CHANGE LESS THAN 60 °C → LOW ABNORMALITY PROGRESS LEVEL | THRESHOLD: LARGE → SLOW NOTIFICATION |
|---|---|---|---|
| | | CHARACTERISTIC CHANGE AT 60°C OR HIGHER → HIGH ABNORMALITY PROGRESS LEVEL | THRESHOLD: SMALL → QUICK NOTIFICATION |
| USAGE MODE | WELDING PROCESS | SMALL NUMBER OF BRAKE OPERATIONS → LOW PROGRESS LEVEL OF BRAKE WEARING-OUT | THRESHOLD: LARGE → SLOW NOTIFICATION |
| | COATING PROCESS | LARGE NUMBER OF BRAKE OPERATIONS → HIGH PROGRESS LEVEL OF BRAKE WEARING-OUT | THRESHOLD: SMALL → QUICK NOTIFICATION |
| USAGE MODE | TOP COATING PROCESS | SMALL NUMBER OF RECIPROCATING OPERATIONS → LOW PROGRESS LEVEL OF SPEED REDUCER BEARING WEARING-OUT | THRESHOLD: LARGE → SLOW NOTIFICATION |
| | INTERMEDIATE COATING PROCESS | LARGE NUMBER OF RECIPROCATING OPERATIONS → HIGH PROGRESS LEVEL OF SPEED REDUCER BEARING WEARING-OUT | THRESHOLD: SMALL → QUICK NOTIFICATION |
| USAGE MODE | FLOOR MOUNTED | SMALL LOAD ON PIVOT SHAFT → LOW ABNORMALITY PROGRESS LEVEL OF SPEED REDUCER OF PIVOT SHAFT | THRESHOLD: LARGE → SLOW NOTIFICATION |
| | WALL HANGING | LARGE LOAD ON PIVOT SHAFT → HIGH ABNORMALITY PROGRESS LEVEL OF SPEED REDUCER OF PIVOT SHAFT | THRESHOLD: SMALL → QUICK NOTIFICATION |

Fig. 14

ABNORMALITY SIGN NOTIFYING SYSTEM, ABNORMALITY SIGN NOTIFYING METHOD, AND PROGRAM

CROSS REFERENCE TO RELATED APPLICATIONS

This application is based upon and claims the benefit of priority from Japanese patent application No. 2017-220039, filed on Nov. 15, 2017, the disclosure of which is incorporated herein in its entirety by reference.

BACKGROUND

The present disclosure relates to an abnormality sign notifying system, an abnormality sign notifying method, and a program. In particular, the present disclosure relates to an abnormality sign notifying system, an abnormality sign notifying method, and a program for notifying a sign of an abnormality occurrence in a device.

Predetermined works such as welding and coating are performed using a device such as an industrial robot in a processing factory for car bodies etc. The device performs a predetermined operation using a motor, a speed reducer, or the like. In such a device, an abnormality may occur in the device due to degradation of the motor, the speed reducer, or the like, which may cause the device to stop operating normally. Thus, it is desirable to diagnose the abnormality of the device and notify an abnormality sign, which is a sign of an abnormality occurrence in the device, before the device stops operating normally.

In connection with the above technique, Japanese Unexamined Patent Application Publication No. 2016-212642 discloses an alarm prediction apparatus that predicts an abnormality occurrence based on time-series event information output by a device or a facility. The alarm prediction apparatus according to Japanese Unexamined Patent Application Publication No. 2016-212642 compares the event information with a previously stored prediction model in order to notify an alarm of the device.

SUMMARY

The progress levels of degradation of parts constituting the device may differ depending on usage environments of the devices and usage modes of the devices. For this reason, it is possible that an abnormality sign of the device may not be notified at an appropriate timing unless the usage environment of the device and the usage mode of the device are considered. When previously stored data is used to diagnose an abnormality sign like in the method according to Japanese Unexamined Patent Application Publication No. 2016-212642, it may be difficult to notify an abnormality sign of the device at an appropriate timing, because the usage environment of the device and the usage mode of the device are not considered.

An object of the present disclosure is to provide an abnormality sign notifying system, an abnormality sign notifying method, and a program capable of notifying an abnormality sign of a device at an appropriate timing.

An abnormality sign notifying system according to the present disclosure is an abnormality sign notifying system that notifies an abnormality sign that is a sign of an abnormality occurrence in a device. The abnormality sign notifying system includes: an operation state acquisition unit configured to acquire operation state data indicating a time-series operation state related to a plurality of the devices; a data storage unit configured to store a plurality of pieces of abnormality data corresponding to the operation state data of at least the device in which an abnormality occurred in the past in association with environmental information indicating an environment in which the device is used and usage mode information indicating a usage mode of the device; an abnormality data selection unit configured to narrow down the plurality of pieces of abnormality data stored in the data storage unit to one or more pieces of the abnormality data based on the environmental information of a target device, the abnormality sign of which is to be notified, among the devices and the usage mode information of the target device to select the abnormality data; a timing setting unit configured to set a timing for notifying the abnormality sign based on the selected abnormality data and the operation state data corresponding to the selected abnormality data of the target device; and a notifying unit configured to notify the abnormality sign related to the target device at the timing set by the timing setting unit.

An abnormality sign notifying method according to the present disclosure notifies an abnormality sign that is a sign of an abnormality occurrence in a device. The abnormality sign notifying method includes: acquiring operation state data indicating a time-series operation state related to a plurality of the devices; storing a plurality of pieces of abnormality data corresponding to the operation state data of at least the device in which an abnormality occurred in the past in association with environmental information indicating an environment in which the device is used and usage mode information indicating a usage mode of the device; narrowing down the plurality of pieces of abnormality data stored in the storing to one or more pieces of the abnormality data based on the environmental information of a target device, the abnormality sign of which is to be notified, among the devices and the usage mode information of the target device to select the abnormality data; setting a timing for notifying the abnormality sign based on the selected abnormality data and the operation state data corresponding to the selected abnormality data of the target device; and notifying the abnormality sign related to the target device at the set timing.

A program according to the present disclosure executes an abnormality sign notifying method for notifying an abnormality sign that is a sign of an abnormality occurrence in a device. The abnormality sign notifying method includes: acquiring operation state data indicating a time-series operation state related to a plurality of the devices; storing a plurality of pieces of abnormality data corresponding to the operation state data of at least the device in which an abnormality occurred in the past in association with environmental information indicating an environment in which the device is used and usage mode information indicating a usage mode of the device; narrowing down the plurality of pieces of abnormality data stored in the storing to one or more pieces of the abnormality data based on the environmental information of a target device, the abnormality sign of which is to be notified, among the devices and the usage mode information of the target device to select the abnormality data; setting a timing for notifying the abnormality sign based on the selected abnormality data and the operation state data corresponding to the selected abnormality data of the target device; and notifying the abnormality sign related to the target device at the set timing.

The above-described configuration according to the present disclosure enables the abnormality data for setting the timing for notifying the abnormality sign to be selected more appropriately from among a huge number of pieces of the abnormality data. Further, the above-described configuration according to the present disclosure can effectively prevent "overlooking" and "overdetection" of the abnormality sign from occurring. Thus, the abnormality sign notifying system according to the present disclosure makes it possible to notify the abnormality sign at a more appropriate timing.

Preferably, the timing setting unit sets a threshold related to the operation state data based on a correlation between the selected abnormality data and the operation state data of the target device, and the notifying unit notifies the abnormality sign when the operation state data of the target device exceeds the threshold.

Such a configuration enables the threshold related to the timing for notifying the abnormality sign to be automatically set. This makes it possible to effectively prevent "overlooking" and "overdetection" of the abnormality sign from occurring. Thus, the abnormality sign notifying system according to the present disclosure makes it possible to notify the abnormality sign at a more appropriate timing.

Preferably, the timing setting unit determines at least one piece of the abnormality data for setting the threshold based on a correlation between a plurality of pieces of the operation state data of the target device and a plurality of pieces of the selected abnormality data and sets, as the threshold, a value of the determined abnormality data a predetermined period before a time when an abnormality has occurred.

Such a configuration enables the threshold to be more appropriately set.

Preferably, the abnormality sign notifying system further includes an abnormality mode setting unit configured to associate an abnormality mode with each of the pieces of the abnormality data. The timing setting unit determines the abnormality mode that is predicted to occur in the target device based on the correlation between the operation state data of the target device and the selected abnormality data.

Such a configuration makes it possible to determine the abnormality mode predicted to occur in the future in the target robot. This enables the user to predict a type of the abnormality mode occurring in the target device.

Preferably, the device operates in each of a plurality of processing processes in a factory including the plurality of processing processes, and when a model of the device used in a first process is the same as that used in a second process among the plurality of processing processes, and the abnormality mode occurring in the devices are the same in the first process and the second process, the timing setting unit sets the timings in such a way that the timings for notifying the abnormality sign in the device used in the first process is different from that in the device used in the second device based on based on the usage mode in the first process and the usage mode in the second process.

The abnormality sign notifying system configured in this manner is configured to notify the abnormality sign related to the device used in processes under more strict conditions at an early timing. Thus, the abnormality sign notifying system can notify the abnormality sign more reliably at the stage of the abnormality sign before an abnormality occurs even in a process used under a more severe condition.

A second abnormality sign notifying system is an abnormality sign notifying system for notifying an abnormality sign that is a sign of an abnormality occurrence in a device used in each of a plurality of processing processes in a factory including the plurality of processing processes. The abnormality sign notifying system includes a notifying unit configured to notify an abnormality sign related to a target device, a sign of an abnormality occurrence of which is to be notified. The plurality of processing processes include a first process and a second process in which the number of brake operations of the device is greater than that of the device in the first process. When models of the devices used in the first process and the second process are the same, and an abnormality mode occurring in the devices are the same in the first process and the second process, the notifying unit notifies the abnormality sign related to the device used in the second process at a timing earlier than a timing at which the abnormality sign related to the device used in the first process is notified.

Such a configuration according to the present disclosure is configured to notify the abnormality sign related to the device used in processes in which the number of brake operation is many at an early timing. Thus, the abnormality sign can be notified more reliably at the stage of the abnormality sign before an abnormality occurs even in a process in which the number of brake operation is many.

A third abnormality sign notifying system is an abnormality sign notifying system for notifying an abnormality sign that is a sign of an abnormality occurrence in a device used in each of a plurality of processing processes in a factory including the plurality of processing processes. The abnormality sign notifying system includes a notifying unit configured to notify an abnormality sign related to a target device, a sign of an abnormality occurrence of which is to be notified. The plurality of processing processes include a first process and a second process in which the number of reciprocating operations of the device is greater than that of the device in the first process. When models of the devices used in the first process and the second process are the same, and an abnormality mode occurring in the devices are the same in the first process and the second process, the notifying unit notifies the abnormality sign related to the device used in the second process at a timing earlier than a timing at which the abnormality sign related to the device used in the first process is notified.

Such a configuration according to the present disclosure is configured to notify the abnormality sign related to the device used in processes in which the number of reciprocating operations is large at an early timing. Thus, the abnormality sign can be notified more reliably at the stage of the abnormality sign before an abnormality occurs even in a process in which the number of reciprocating operations is large.

The present disclosure can provide an abnormality sign notifying system, an abnormality sign notifying method, and a program capable of notifying an abnormality sign of a device at an appropriate timing.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 7 is a view exemplifying ranking of the abnormality data made by an abnormality data determination unit according to the first embodiment;

FIG. 14 is a view exemplifying different progress levels of abnormalities depending on a usage environment and a usage mode with the same model of the robots;

DESCRIPTION OF EMBODIMENTS

First Embodiment

Hereinafter, embodiments of the present disclosure will be described with reference to the drawings.

Figure 1:
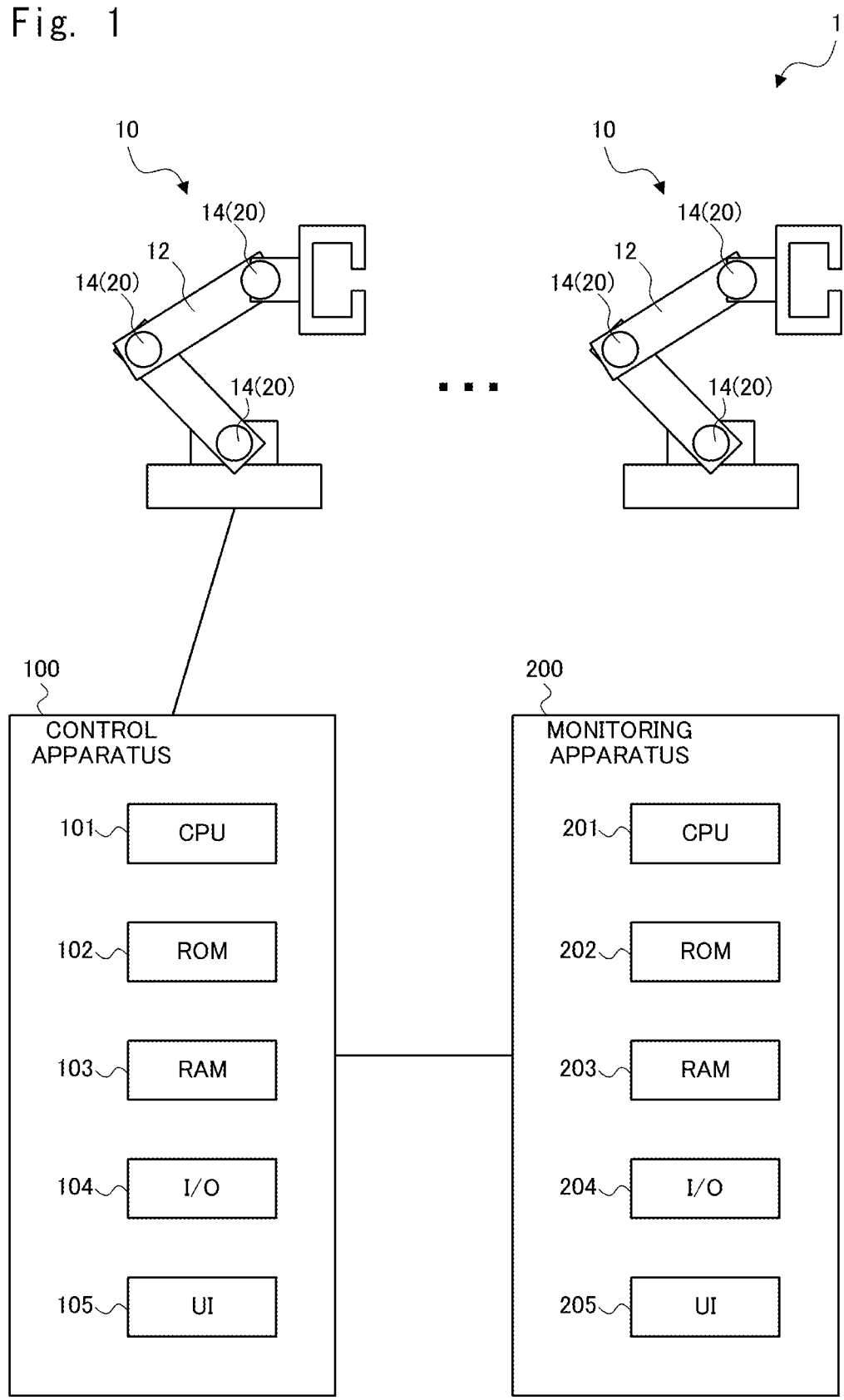
FIG. 1 is a view showing an abnormality sign notifying system according to a first embodiment.
Figure 2:
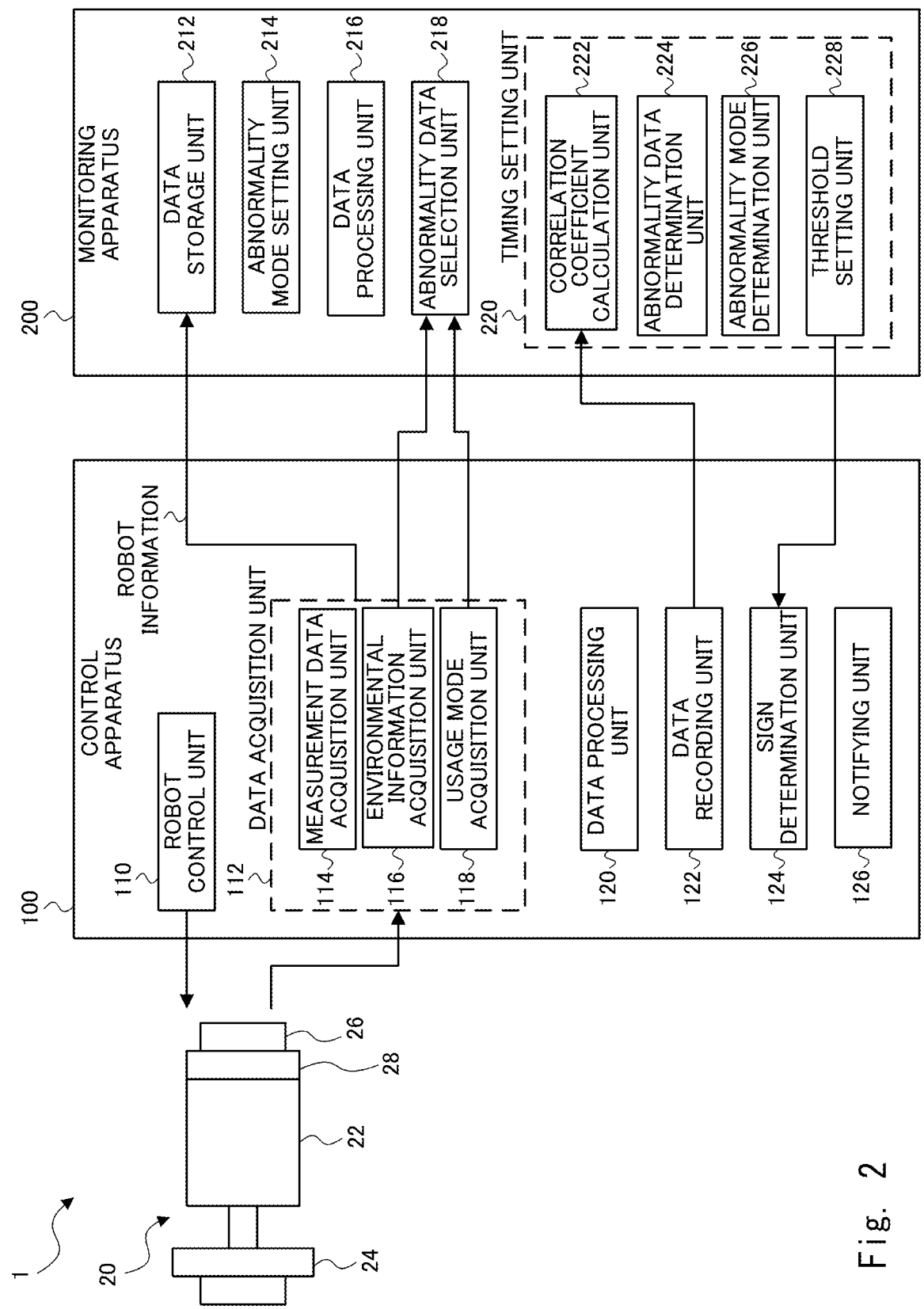
FIG. 2 is a functional block diagram showing a configuration of respective apparatuses of the abnormality sign notifying system according to the first embodiment.

FIG. 1 is a view showing an abnormality sign notifying system 1 according to a first embodiment. FIG. 2 is a functional block diagram showing a configuration of respective apparatuses of the abnormality sign notifying system 1 according to the first embodiment. The abnormality sign notifying system 1 includes a plurality of robots 10, a control apparatus 100, and a monitoring apparatus 200. The abnormality sign notifying system 1 is provided, for example, in a factory that includes a plurality of processes. Then, the abnormality sign notifying system 1 is configured to notify a sign of an abnormality occurrence in the robot 10 (device) that is used in each of the plurality of processes.

The robot 10 is, for example, a device such as an industrial robot. The control apparatus 100 may be provided for each of the plurality of robots 10. At least one monitoring apparatus 200 needs to be provided in the abnormality sign notifying system 1. The control apparatus 100 is, for example, communicably connected to the robot 10 in a wired or wireless manner. The monitoring apparatus 200 is, for example, communicably connected to the control apparatus 100 in a wired or wireless manner. The control apparatus 100 performs processing necessary for controlling an operation of the corresponding robot 10. The monitoring apparatus 200 performs processing necessary for diagnosing an abnormality of each of the plurality of robots 10. Further, the monitoring apparatus 200 stores data related to the robot 10 in which an abnormality such as a failure occurred in the past.

The robots 10 are installed, for example, in the vicinity of the vehicle manufacture line. The robot 10 is a robot for performing a predetermined work such as welding (e.g., spot welding) and coating (e.g., intermediate coating or top coating) on vehicles. The robot 10 includes one or more arms 12. The arm 12 includes one or more joints 14. The joint 14 includes a motor apparatus 20. The motor apparatus 20 includes a motor 22 that drives the joint 14 and a speed reducer 24 for transmitting power of the motor 22 to the joint 14. The motor apparatus 20 further includes a brake 26 that brakes rotation of the motor 22. The motor apparatus 20 further includes an encoder 28 that detects a rotation angle of the motor 22. The control apparatus 100 operates the joint 14 by controlling operations of the motor 22 and the brake 26. In this way, the robot 10 is configured to perform a desired operation. That is, the robot 10 is a joint drive robot that operates by driving the joint 14.

The control apparatus 100 includes, for example, a function as a computer. The control apparatus 100 may be mounted inside the robot 10 or may be communicably connected to the robot 10 in a wired or wireless manner. The control apparatus 100 may be a control panel or an operation panel installed in the vicinity of the robot 10. The control apparatus 100 includes a CPU (Central Processing Unit) 101, a ROM (Read Only Memory) 102, a RAM (Random Access Memory) 103, an I/O (Input/Output) 104, and a UI (User Interface) 105 as hardware.

The CPU 101 includes a function as a processing device that performs control processing, calculation processing, and the like. The ROM 102 includes a function of storing a control program and a calculation program to be executed by the CPU 101. The RAM 103 includes a function of temporarily storing processing data and the like. The I/O 104 is an input/output apparatus. The I/O 104 inputs data and signals from the outside, for example, from the robot 10 or the monitoring apparatus 200, and outputs data and signals to the outside. The UI 105 is composed of, for example, an input device such as a keyboard and an output device such as a display. The UI 105 may be implemented as a touch panel in which the input device and the output device are integrated. Alternatively, the UI 105 may be a remote controller physically independent from the control apparatus 100 that includes a control panel and the like and is connected to the CPU 101 and the like of the control apparatus 100 in a wired or wireless manner. Note that the ROM 102 is configured to be capable of storing an operation program (teaching data) for controlling the robot 10.

The monitoring apparatus 200 includes, for example, a function as a computer. The monitoring apparatus 200 may be installed, for example, in a central monitoring room of a factory provided with the abnormality sign notifying system 1. The monitoring apparatus 200 includes a CPU 201, a ROM 202, a RAM 203, an I/O 204, and a UI 205 as hardware.

The CPU 201 includes a function as a processing device that performs control processing, calculation processing, and the like. The ROM 202 includes a function of storing a control program and a calculation program to be executed by the CPU 201. The RAM 203 includes a function of temporarily storing processing data and the like. The I/O 204 is an input/output apparatus. The I/O 204 inputs data and signals from the outside, for example, from the control apparatus 100, and outputs data and signals to the outside. The UI 205 is composed of, for example, an input device such as a keyboard and an output device such as a display. The UI 205 may be implemented as a touch panel in which the input device and the output device are integrated.

As shown in FIG. 2, the control apparatus 100 includes a robot control unit 110, a data acquisition unit 112, a data processing unit 120, a data recording unit 122, a sign determination unit 124, and a notifying unit 126. The data acquisition unit 112 includes a measurement data acquisition unit 114, an environmental information acquisition unit 116, and a usage mode acquisition unit 118. Each component of the control apparatus 100 shown in FIG. 2 can be implemented by the CPU 101 executing the program stored in the ROM 102. The control apparatus 100 may record a necessary program on a specified non-volatile recording medium, and install the program as necessary. Each component of the control apparatus 100 shown in FIG. 2 is not limited to be implemented by software as described above, and instead may be implemented by hardware such as some kind of a circuit element.

One or more of the components of the control apparatus 100 shown in FIG. 2 may be implemented by an apparatus different from the control apparatus 100. The data recording unit 122, the sign determination unit 124, and the notifying unit 126 may be implemented by, for example, an apparatus different from the control apparatus 100 (e.g., the monitoring apparatus 200). That is, an apparatus that controls the robot 10 and acquires necessary data and information may be a physically separate apparatus from an apparatus that diagnoses an abnormality of the robot 10.

As shown in FIG. 2, the monitoring apparatus 200 includes a data storage unit 212, an abnormality mode setting unit 214, a data processing unit 216, an abnormality data selection unit 218, and a timing setting unit 220. The timing setting unit 220 includes a correlation coefficient calculation unit 222, an abnormality data determination unit 224, an abnormality mode determination unit 226, and a threshold setting unit 228. Each component of the monitoring apparatus 200 shown in FIG. 2 can be implemented by the CPU 201 executing the program stored in the ROM 202. Like the control apparatus 100, the monitoring apparatus 200 may record a necessary program on a specified non-volatile recording medium, and install the program as necessary. Note that, like the control apparatus 100, each component of the monitoring apparatus 200 shown in FIG. 2 is not limited to be implemented by software as described above, and instead may be implemented by hardware such as some kind of a circuit element. One or more of the components of the monitoring apparatus 200 shown in FIG. 2 may be implemented by an apparatus different from the monitoring apparatus 200 (e.g., the control apparatus 100).

Next, each component of the control apparatus 100 shown in FIG. 2 will be described.

The robot control unit 110 controls the operation of the robot 10. The robot control unit 110 may control the robot 10 in accordance with the operation program stored in the ROM 102. Specifically, the robot control unit 110 controls the operation of the motor apparatus 20 of the robot 10. That is, the robot control unit 110 controls the motor 22 and the brake 26 of the motor apparatus 20. More specifically, the robot control unit 110 transmits a command current indicating a command current value, which is a control value (a command value), to the motor 22 in order to operate the motor 22. The robot control unit 110 receives an encoder value indicating the rotation angle of the motor 22 from the encoder 28. The robot control unit 110 may rotate the motor 22 using the rotation angle indicated by the encoder value by, for example, feedback control in such a way that the joint 14 of the robot 10 performs a predetermined operation. Further, the robot control unit 110 transmits a brake signal (a brake release signal) to the brake 26 in order to release the brake 26.

The data acquisition unit 112 acquires robot information, which is data (information) related to the robot 10, from the motor apparatus 20 (the motor 22). At this time, the data acquisition unit 112 may acquire the robot information together with identification information of the robot 10. The data acquisition unit 112 transmits the acquired robot information to the monitoring apparatus 200. The robot information may include the identification information of the robot 10, measurement data, environmental information, and usage mode information, which will be described later.

The measurement data acquisition unit 114 acquires the measurement data measured by the motor apparatus 20. The measurement data is raw data indicating an operation state of the robot 10 (the motor apparatus 20). Thus, the measurement data acquisition unit 114 may include a function as an operation state acquisition unit that acquires the operation state of the robot 10. The measurement data is, for example, the command current value, the brake signal, and the encoder value. However, the measurement data is not limited to these values. The measurement data acquisition unit 114 may acquire, for example, a motor current value.

The environmental information acquisition unit 116 acquires the environmental information indicating an environment in which the robot 10 is used. The environmental information is, for example, an ambient temperature at which the robot 10 is used. The environmental information acquisition unit 116 may acquire the ambient temperature, for example, by acquiring an encoder temperature from the encoder 28. Note that the encoder temperature may be measured by a temperature sensor or the like provided in the encoder 28. The measurement data and the environmental information are acquired in time series. The measurement data and the environmental information may be measured, for example, every few seconds (e.g., within 10 seconds). The measurement data and the environmental information include a measurement value and a measured time when the measurement value is measured. The "measured time" here is an elapsed time since the start of use of the robot 10.

The usage mode acquisition unit 118 acquires usage mode information indicating a usage mode of the robot 10 to be controlled by the control apparatus 100. Note that the usage mode acquisition unit 118 may store the usage mode information in advance. The usage mode here indicates how the robot 10 (and the corresponding control apparatus 100) is used. The usage mode may include, for example, a model (such as a model number) of the robot 10. The usage mode may further include processing processes (a welding process, a coating process, etc.) in which the robot 10 is used. The usage mode may further include a mounting direction of the robot 10 in the factory.

The data processing unit 120 processes the measurement data acquired by the measurement data acquisition unit 114 and converts it into data for determination. The data for determination is used for determining an abnormality sign, which will be described later. The data for determination indicates the operation state of the robot 10. That is, the data processing unit 120 may include a function as an operation state acquisition unit that acquires the operation state of the robot 10. The measurement data is obtained in time series. Thus, the data for determination indicates the operation state in time series. Examples of the data for determination include an average command current value, a maximum current value, a standard deviation, an amplitude, and a suction time, although the data for determination is not limited to them. Hereinafter, the term "operation state data" including the measurement data and data for determination may be used.

The data processing unit 120 acquires, for example, the average command current value, the maximum current value, the standard deviation, and the amplitude, using the command current value. The average command current value is, for example, an average value of the command current values in one cycle of the operation of the robot 10. The maximum current value is, for example, a maximum command current value in one cycle of the operation of the robot 10. The standard deviation is, for example, a deviation from the average value of the command current values. The amplitude is an amplitude of the command current value fluctuations (a difference between maximum and minimum values in one cycle). Note that the data processing unit 120 may acquire an average value of the amplitudes (an average value in one cycle of the operation of the robot 10) or a maximum value of the amplitudes (a maximum value in one cycle of the operation of the robot 10).

The average command current value, the maximum current value, the standard deviation, and the amplitude tend to increase as the degradation of the bearing or the gear (the speed reducer 24) of the motor apparatus 20 progresses. Thus, the average command current value, the maximum current value, the standard deviation, and the amplitude may be used to determine a sign of an abnormality mode related to the bearing or gear.

Further, the data processing unit 120 acquires a motor rotation speed using the encoder value. The motor rotation speed may be calculated from an amount of change in the encoder value (rotation angle). The data processing unit 120 may acquire the average command current value, the maximum current value, the standard deviation, the amplitude, and the like using the command current value when the motor rotation speed is substantially constant (the amplitude of the rotation speed fluctuation falls within a certain range). By doing so, the influence of the fluctuation of the motor rotation speed can be eliminated from the average command current value, the maximum current value, the standard deviation, the amplitude, and the like. That is, the average command current value, the maximum current value, the standard deviation, the amplitude, and the like more reliably indicate the progress of degradation (a sign of an abnormality) of each part of the robot 10.

Further, the data processing unit 120 acquires the suction time from the brake signal. The suction time is a time from when the brake signal (the brake release signal) is transmitted to when the brake 26 is actually released and then the joint 14 of the robot 10 becomes operable. Thus, the data processing unit 120 may also use, as the suction time, a difference between the time when the brake signal is generated and the time when the robot 10 actually becomes operable (e.g., the time when the encoder value rises or the time when the motor current value rises). The suction time tends to become longer as the disc of the brake 26 wears out. Therefore, the suction time may be used to determine a sign of an abnormality mode related to the brake.

The data recording unit 122 stores the operation state data (the data for determination) acquired by the data processing unit 120. In this case, the data recording unit 122 may record the operation state data in a state represented by a waveform in time series. Note that the data recording unit 122 may record only the data for determination.

The sign determination unit 124 determines the sign of the abnormality occurrence in the robot 10. That is, the sign determination unit 124 determines whether there is a possibility that some abnormality may occur in the robot 10 anytime soon (within a predetermined time, for example, within 30 days). Specifically, when one or more pieces of the operation state data (the data for determination) exceeds a threshold set by the threshold setting unit 228, the sign determination unit 124 determines that there is the sign of the abnormality occurrence in the robot 10. Details will be described later. Hereinafter, the robot 10 for which it is to be determined whether an abnormality sign occurs therein (i.e., the robot 10, an abnormality sign of which is to be notified) is sometimes referred to as a target robot (a target device).

The notifying unit 126 notifies the abnormality sign of the robot 10 when the sign determination unit 124 determines that there is the sign of the abnormality occurrence in the robot 10. The notifying unit 126 may notify the abnormality sign by, for example, controlling the UI 105 such as a speaker to generate an alarm sound. Alternatively, the notifying unit 126 may notify the abnormality sign by, for example, controlling the UI 105 such as the display to visually display an alarm.

Next, each component of the monitoring apparatus 200 shown in FIG. 2 will be described.

The data storage unit 212 obtains the robot information from the data acquisition unit 112 of the control apparatus 100 and stores it. In particular, the data storage unit 212 stores the robot information related to the robot 10 in which an abnormality such as a failure or malfunction has occurred.

When an abnormality occurs in a certain robot 10, the abnormality mode setting unit 214 associates an abnormality mode (a failure mode) indicating a type of the abnormality (e.g., a type of the abnormality and a member in which the abnormality has occurred) with the robot information related to the robot 10). Thus, the robot information related to the robot 10 in which the abnormality has occurred, which is stored in the data storage unit 212, includes information indicating the abnormality mode (abnormality mode information).

Hereinafter, the robot information related to the robot 10 in which the abnormality has occurred is sometimes referred to as abnormal robot information. The abnormal robot information may include the identification information of the robot 10, the abnormality mode information, the measurement data, the environmental information, and the usage mode information. The operation state data related to the robot 10 in which the abnormality has occurred is sometimes referred to as "abnormality data". That is, the abnormality data corresponds to the operation state data indicating the operation state of the robot 10 in which the abnormality occurred in the past. The abnormality mode setting unit 214 associates the abnormality mode with each piece of the abnormality data.

The data processing unit 216 may perform substantially the same processing as that of the data processing unit 120 of the control apparatus 100. That is, the data processing unit 216 processes the measurement data stored in the data storage unit 212 and converts it into the data for determination. As described above, the data for determination indicates the operation state of the robot 10. Thus, the data processing unit 216 may include a function as an operation state acquisition unit that acquires the operation state of the robot 10.

The abnormality data selection unit 218 selects the abnormality data related to the robot 10 having the usage environment and usage mode similar to those of the target robot from among a plurality of pieces of the abnormality data (the abnormal robot information) stored in the data storage unit 212. That is, the abnormality data selection unit 218 narrows down one or more pieces of the abnormality data in order to select the abnormality data related to the robot 10 having the usage environment and usage mode similar to those of the target robot based on the environmental information related to the target robot and the usage mode information related to the target robot. Details will be described later.

The timing setting unit 220 sets a timing for notifying the abnormality sign based on the abnormality data selected by the abnormality data selection unit 218 and the operation state data of the target robot corresponding to the selected abnormality data. Specifically, the timing setting unit 220 sets a threshold related to the operation state data based on a correlation between the selected abnormality data and the operation state data of the target robot. Details will be described later.

The correlation coefficient calculation unit 222 calculates a correlation coefficient between the abnormality data selected by the abnormality data selection unit 218 and the operation state data of the target robot. The abnormality data determination unit 224 determines the abnormality data having the largest correlation coefficient. The abnormality mode determination unit 226 determines the abnormality mode of the abnormality data having the largest correlation coefficient. The threshold setting unit 228 sets, as the threshold, a value of the abnormality data as at a predetermined period before (M days before) the time when the abnormality has occurred among the abnormality data determined by the abnormality data determination unit 224. In this case, M is an integer of 1 or more (e.g., 30 (days before)). Specific processing of the correlation coefficient calculation unit 222, the abnormality data determination unit 224, the abnormality mode determination unit 226, and the threshold setting unit 228 will be described later in detail.

Figure 3:
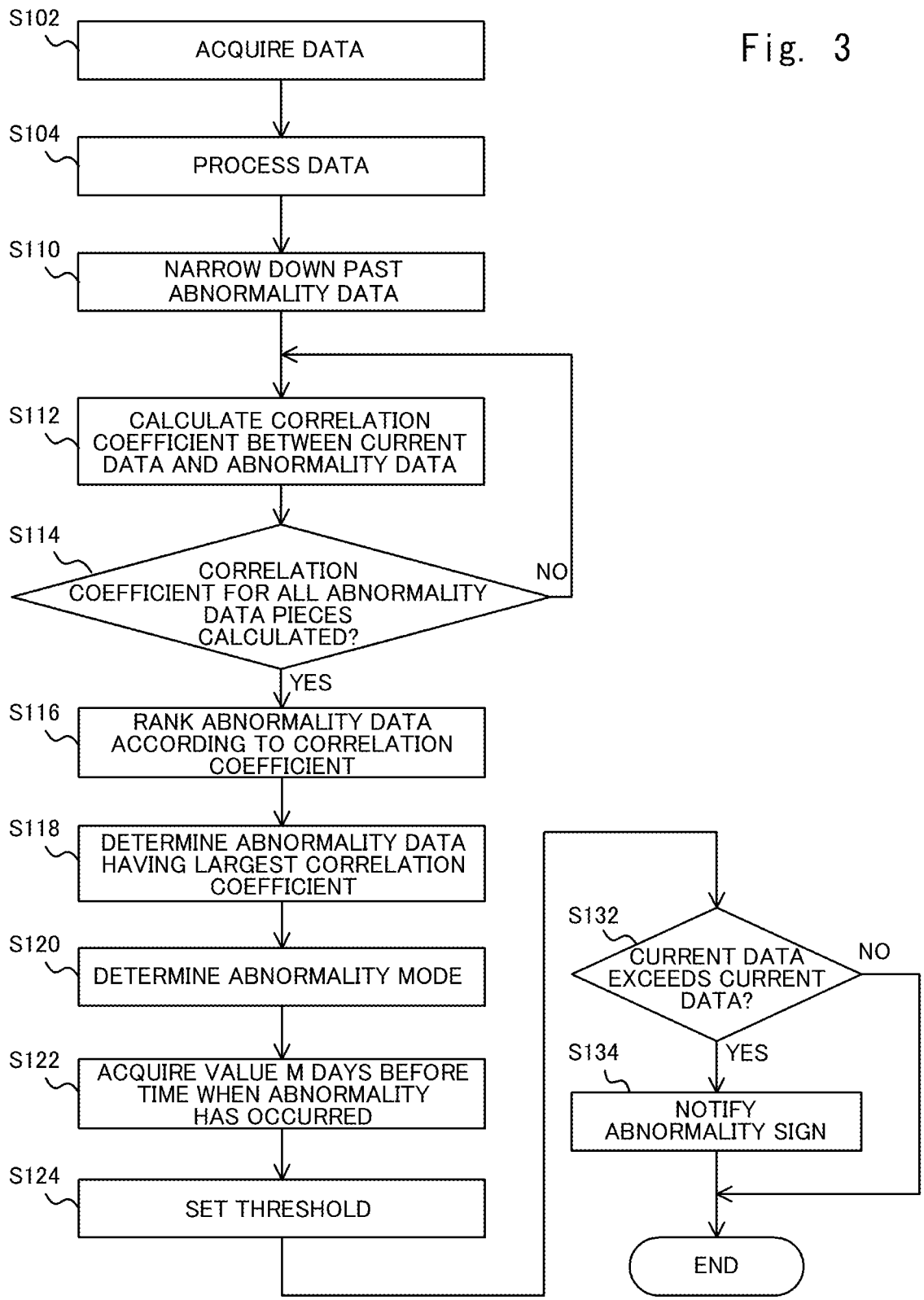
FIG. 3 is a flowchart showing an abnormality sign notifying method executed by the abnormality sign notifying system according to the first embodiment.

FIG. 3 is a flowchart showing an abnormality sign notifying method executed by the abnormality sign notifying system 1 according to the first embodiment. The abnormality sign notifying system 1 performs processing shown in FIG. 3 for each target robot for, as an example, once a day.

The control apparatus 100 acquires the robot information (Step S102). Specifically, as described above, the data acquisition unit 112 of the control apparatus 100 acquires the robot information (the measurement data) of the target robot. Then, the control apparatus 100 performs necessary processing on the measurement data (Step S104). Specifically, as described above, the data processing unit 120 of the control apparatus 100 processes the measurement data of the target robot and acquires the data for determination. At this time, the data processing unit 120 may generate a waveform representing the data for determination related to the target robot in time series. The data for determination (the operation state data) of the target robot is sometimes referred to as "current data", meaning that it is related to the robot 10 currently in operation (the measurement data of which is being measured), in order to compare the data for determination of the target robot with the abnormality data related to the robot 10 in which an abnormality occurred in the past.

The monitoring apparatus 200 narrows down the stored past abnormality data according to the usage mode and usage environment of the target robot (Step S110). Specifically, the abnormality data selection unit 218 of the monitoring apparatus 200 acquires the environmental information related to the target robot from the environmental information acquisition unit 116. The abnormality data selection unit 218 further acquires the usage mode information related to the target robot from the usage mode acquisition unit 118. The abnormality data selection unit 218 narrows down the many pieces of the abnormality data (the abnormal robot information) stored in the data storage unit 212, using the acquired environmental information and usage mode information, to the abnormality data (the abnormal robot information) necessary for setting the notifying timing of the abnormality sign, which will be described later.

Figure 4:
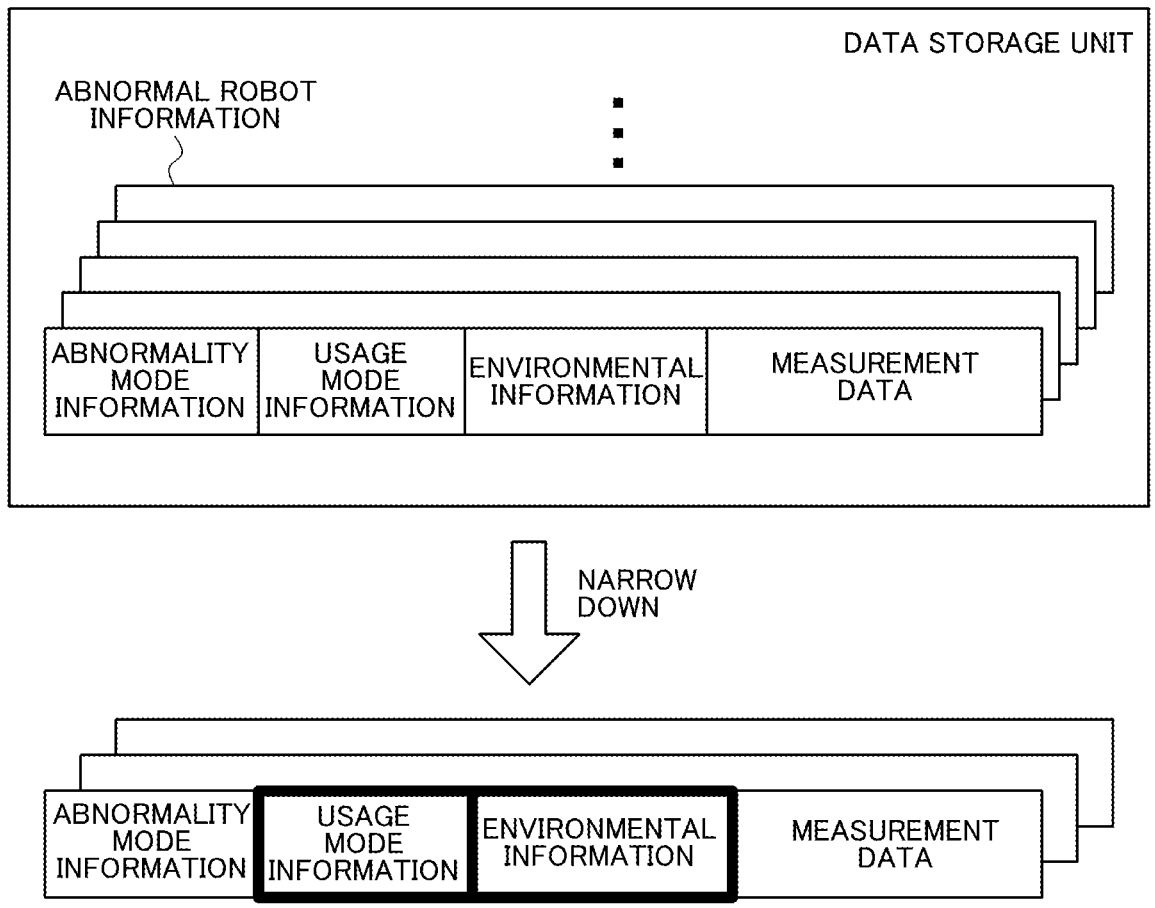
FIG. 4 is a view for describing narrowing down of abnormality data according to the first embodiment.

FIG. 4 is a view for describing the narrowing down of the abnormality data according to the first embodiment. As shown in FIG. 4, the data storage unit 212 stores many pieces of the abnormal robot information. Each abnormal robot information piece includes the abnormality mode information, the usage mode information, the environmental information, and the measurement data. As described above, the measurement data may include parameters such as the command current value, the brake signal, and the encoder value. That is, the data storage unit 212 stores the abnormality data (the operation state data of the robot 10 in which the abnormality has occurred) in association with the usage mode information and the environmental information.

The abnormality data selection unit 218 selects the abnormal robot information that includes the usage mode information indicating the same usage mode as the usage mode indicated by the usage mode information related to the target robot and includes the environmental information indicating the usage environment which is the same as or similar to the usage environment indicated by the environmental information related to the target robot. The following is an explanation of "the same or similar usage environment (the usage environment which is the same as or similar)". For example, the environmental information indicating a temperature change in which the correlation coefficient with a temperature change in time series related to the target robot is larger than or equal to a predetermined value may be "environmental information indicating the same or similar usage environment". When a difference between an average value of the temperature related to the target robot and an average value of the temperature related to the abnormal robot information is less than or equal to a predetermined value, the environmental information related to the abnormal robot information is sometimes referred to as the "environmental information indicating the same or similar usage environment". For example, when the usage mode information of the target robot indicates "model A" and "coating process", and the environmental information indicates "average temperature: 50 degrees", the abnormality data selection unit 218 may select, from the data storage unit 212, the abnormal robot information including the usage mode information indicating "model A" and "coating process" and the environmental information indicating the average temperature near "average temperature: 50 degrees".

Then, the data processing unit 216 converts the measurement data included in the abnormal robot information selected by the abnormality data selection unit 218 into the data for determination. The abnormality data is narrowed down based on the usage mode information and environmental information through the above processing.

Next, the monitoring apparatus 200 calculates the correlation coefficient between the current data and the abnormality data (Step S112). Specifically, the correlation coefficient calculation unit 222 calculates the correlation coefficient between the current data and the abnormality data. Next, when the correlation coefficients have not been calculated for all the abnormality data pieces (the abnormality modes) selected by the abnormality data selection unit 218 (NO in Step S114), the correlation coefficient calculation unit 222 calculates the correlation coefficient for the abnormality data for which the correlation coefficient has not been calculated. Then, when the correlation coefficients are calculated for all the abnormality data pieces (the abnormality modes) selected by the abnormality data selection unit 218 (YES in Step S114), the process proceeds to S116, which will be described later.

Figure 5:
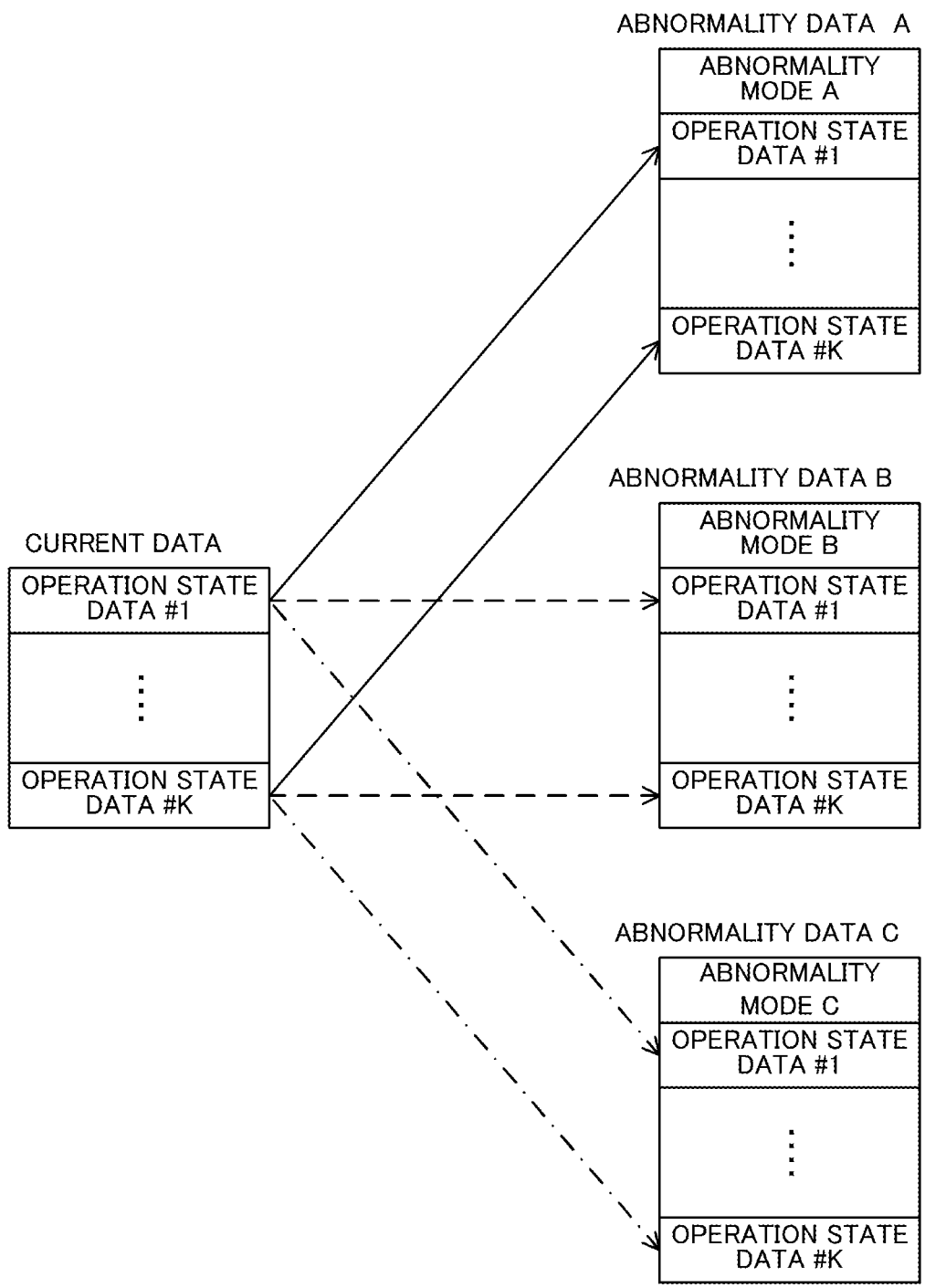
FIG. 5 is a view for describing calculation of a correlation coefficient between current data and the abnormality data according to the first embodiment.
Figure 6:
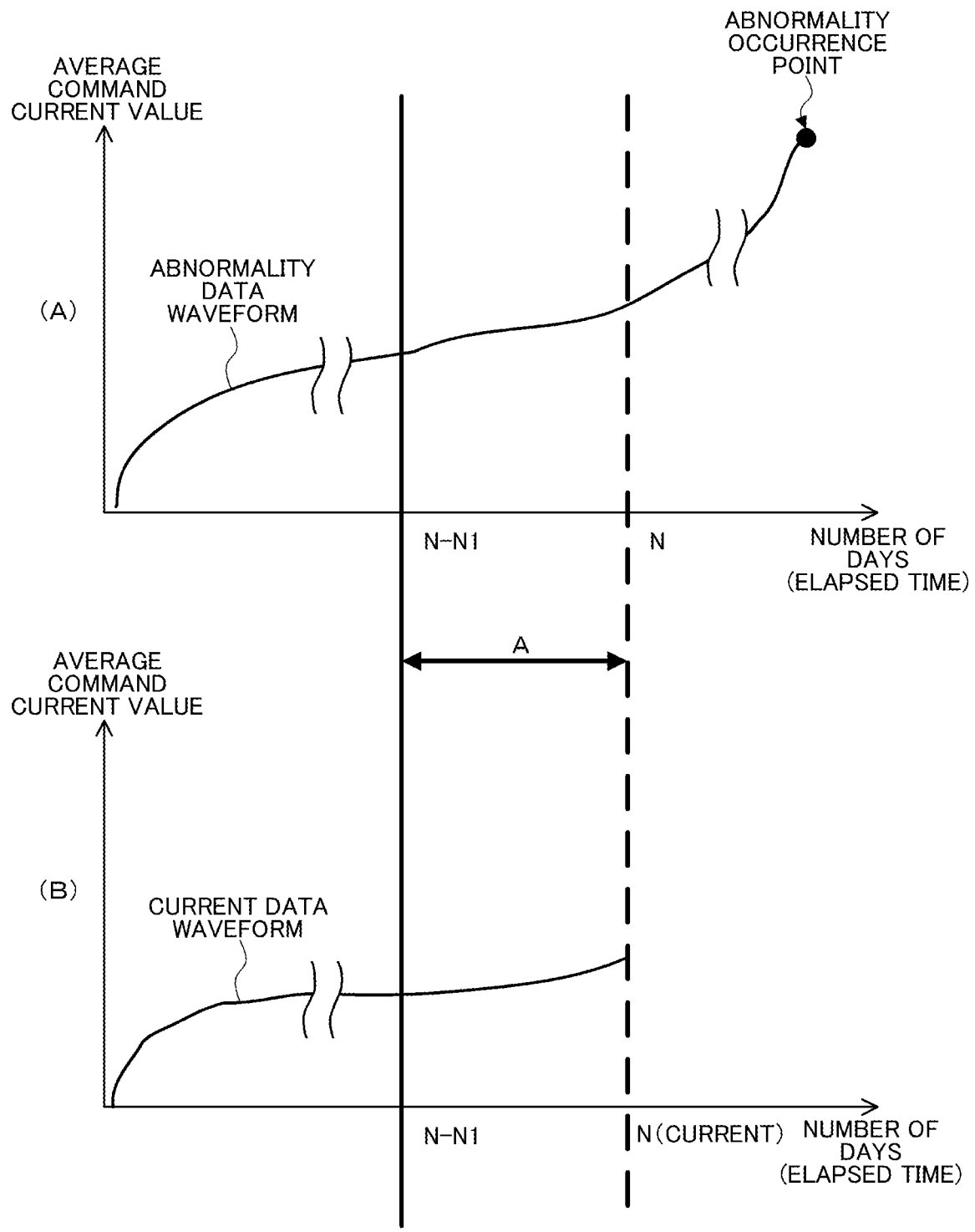
FIG. 6 is a view for describing calculation of a correlation coefficient between the current data and the abnormality data according to the first embodiment.

FIGS. 5 and 6 are views for describing the calculation of the correlation coefficient between the current data and the abnormality data according to the first embodiment. In the processing of S110, as shown in FIG. 5, suppose that abnormality data A, abnormality data B, and abnormality data C are selected. The current data includes a plurality of pieces of operation state data #1 to #K (K is an integer of 1 or greater). The operation state data #1 is, for example, the average command current value, and the operation state data #2 is, for example, the maximum current value. The operation state data #3 is, for example, the standard deviation, and the operation state data #4 is, for example, the amplitude. The operation state data #5 is, for example, the suction time. Like the current data, each piece of the abnormality data also includes a plurality of pieces of operation state data #1 to #K.

Further, an abnormality mode A, an abnormality mode B, and an abnormality mode C are associated with the abnormality data A, the abnormality data B, and the abnormality data C, respectively. The abnormality mode A is, for example, "flaking of the motor bearing". The abnormality mode B is, for example, "chipping of the speed reducer gear". The abnormality mode C is, for example, "foreign matter which has bitten into the motor bearing".

As indicated by the solid arrows in FIG. 5, the correlation coefficient calculation unit 222 calculates the correlation coefficient between the operation state data #1 of the current data and the operation state data #1 of the abnormality data A. Likewise, the correlation coefficient calculation unit 222 calculates the correlation coefficient between each piece of the operation state data #2 to #K of the current data and each piece of the operation state data #2 to #K of the abnormality data A, respectively. Further, as indicated by the dashed arrows in FIG. 5, the correlation coefficient calculation unit 222 calculates the correlation coefficient between each piece of the current operation state data #1 to #K of the current data and each piece of the operation state data #1 to #K of the abnormality data B, respectively. Furthermore, as indicated by the long dashed short dashed arrows in FIG. 5, the correlation coefficient calculation unit 222 calculates the correlation coefficient between each piece of the operation state data #1 to #K of the current data and each piece of the operation state data #1 to #K of the abnormality data C, respectively.

FIG. 6(A) shows a waveform (an abnormality data waveform) representing the abnormality data. The horizontal axis indicates the number of days (elapsed time) since the start of use of the robot 10 in which an abnormality related to this abnormality data has occurred. The vertical axis represents the value of the operation state data (the average command current value in the example of FIG. 6). FIG. 6(B) shows a waveform (a current data waveform) representing the current data. The horizontal axis indicates the number of days (elapsed time) since the start of use of the target robot. The vertical axis represents the value of the operation state data (the average command current value in the example of FIG. 6).

When the number of days since the start of use of the target robot is N days, the correlation coefficient calculation unit 222 calculates the correlation coefficient between the abnormality data and the current data for a period A between (N−N1)th day, which is a predetermined number N1 of days preceding (i.e., before) the Nth day, and the Nth day. The N1 (the period A) may be, for example, one year (365 days), one month (30 days), or both.

When the correlation coefficient is calculated for all pieces of the abnormality data (the abnormality modes) (YES in S114), the monitoring apparatus 200 ranks the abnormality data (the operation state data) according to the correlation coefficient (Step S116). Then, the monitoring apparatus 200 determines the abnormality data (the operation state data) having the largest correlation coefficient (Step S118). Further, the monitoring apparatus 200 determines the abnormality mode related to the determined abnormality data (Step S120).

Specifically, as shown in FIG. 7, the abnormality data determination unit 224 of the monitoring apparatus 200 ranks the abnormality data (the operation state data) in descending order of the correlation coefficient. Then, the abnormality data determination unit 224 determines the abnormality data (the operation state data) having the largest correlation coefficient as data used for setting the notifying timing of the abnormality sign. Further, the abnormality mode determination unit 226 of the monitoring apparatus 200 determines the abnormality mode related to the abnormality data (the operation state data) having the largest correlation coefficient as an abnormality mode that may occur in the target robot in the future. The abnormality mode determination unit 226 determines the abnormality mode in a manner described above, thereby making it possible to determine the abnormality mode that is predicted to occur in the target robot in the future. This enables the user to predict what kind of abnormality mode may occur in the target robot.

FIG. 7 is a view showing the ranking of the abnormality data made by the abnormality data determination unit 224 according to the first embodiment. In the example shown in FIG. 7, the correlation coefficient for the operation state data #4 (the amplitude) of the abnormality data A that is the abnormality mode A (flaking of the motor bearing) is 0.98. The correlation coefficient for the operation state data #2 (the maximum current value) of the abnormality data A that is the abnormality mode A is 0.88. The correlation coefficient for the operation state data #2 of the abnormality data B that is the abnormality mode B (chipping of the speed reducer gear) is 0.74. The correlation coefficient for the operation state data #3 (the standard deviation) for the abnormality data C that is the abnormality mode C (foreign matter which has bitten into the motor bearing) is 0.72.

Thus, the abnormality data determination unit 224 determines the operation state data #4 of the abnormality data A that is ranked first in the correlation coefficient ranking as the data to be used for setting the notifying timing of the abnormality sign. Then, the abnormality mode determination unit 226 determines the abnormality mode A as the abnormality mode that may occur in the target robot in the near future.

The monitoring apparatus 200 acquires the value of the abnormality data (the operation state data) M days, which is the predetermined period, before the occurrence of the abnormality from among the abnormality data (the operation state data) determined in the processing of S118 (Step S122). Then, the monitoring apparatus 200 sets the threshold using the value of the abnormality data (the operation state data) acquired in the processing of S122 (Step S124).

Figure 8:
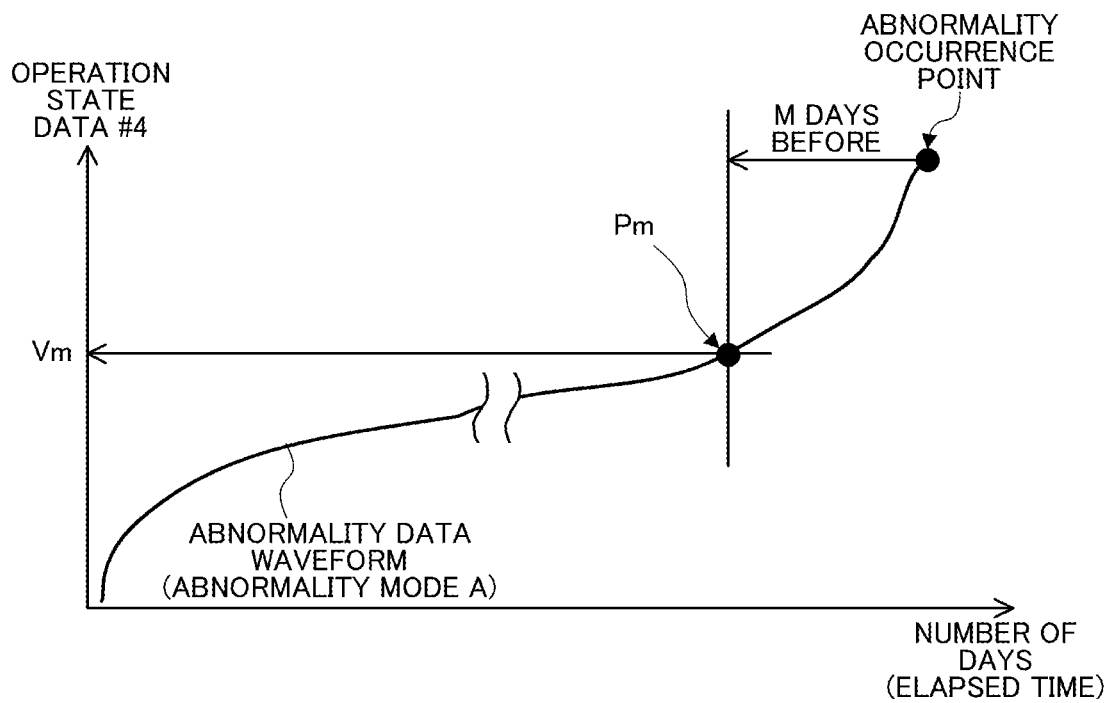
FIG. 8 is a view for describing a threshold setting method according to the first embodiment.
Figure 9:
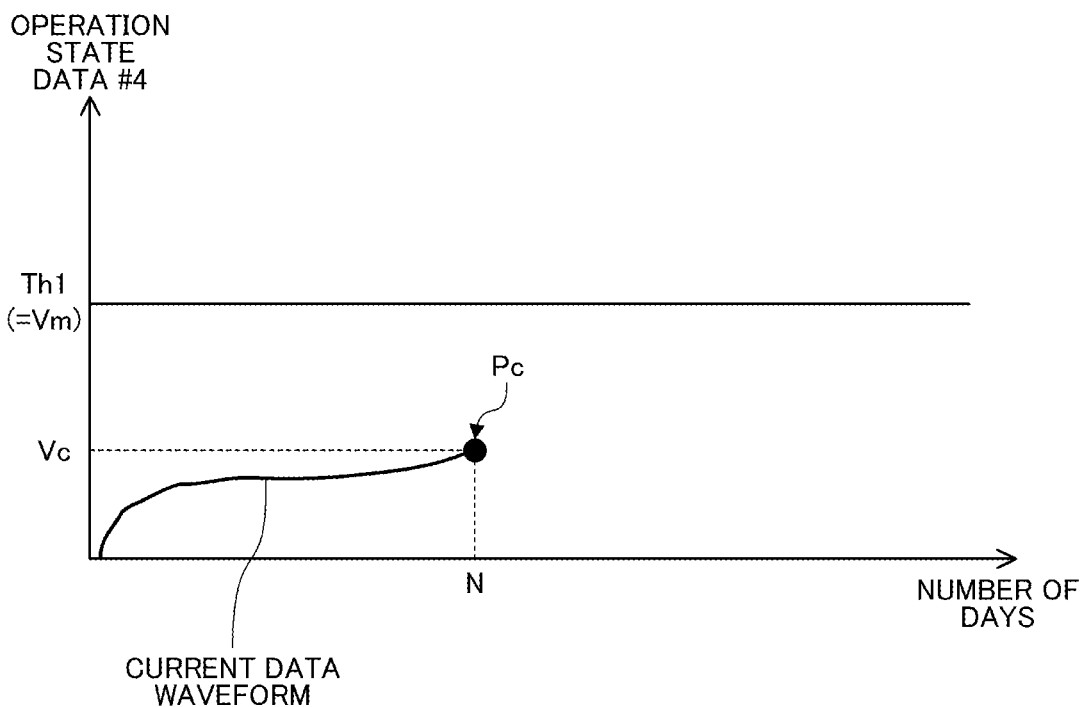
FIG. 9 is a view showing a state in which a threshold is set for the current data.

FIG. 8 is a view for describing a threshold setting method according to the first embodiment. FIG. 8 shows a waveform of the operation state data #4 (the amplitude) of the abnormality data A (the abnormality mode A; flaking of the motor bearing) determined in the processing of S118. The vertical axis indicates the value of the operation state data #4 in the abnormality data. The threshold setting unit 228 of the monitoring apparatus 200 identifies a point Pm, which is at M days (e.g., 30 days) before the abnormality occurrence point, and acquires a value Vm of the operation state data #4 at the point Pm. Then, as shown in FIG. 9, which will be described later, the threshold setting unit 228 sets the value Vm as a threshold Th1 for the operation state data #4. The value of M can be set by the user as appropriate. In this way, the threshold setting unit 228 sets the threshold using the value Vm of the operation state data at the point Pm, which is at M days before the abnormality occurrence point. This enables the threshold to be more appropriately set.

FIG. 9 is a view showing a state in which the threshold is set for the current data. FIG. 9 shows a waveform of the current data for the operation state data #4 (the amplitude). Pc is a point indicating the current data and is a point at the Nth day from the start of use of the target robot. Vc indicates a value of the operation state data #4 at the current point Pc. Further, the threshold Th1 is equal to Vm shown in FIG. 8.

The control apparatus 100 determines whether the current data exceeds the threshold set in the processing of S124 (Step S132). The sign determination unit 124 of the control apparatus 100 determines whether the operation state data of the current data related to the threshold in the processing of S124 exceeds the threshold. Then, when the current data exceeds the threshold (YES in S132), the notifying unit 126 of the control apparatus 100 notifies the abnormality sign (Step S134).

In the case shown in FIG. 9, the sign determination unit 124 determines whether the current value Vc of the operation state data #4 of the current data exceeds the threshold Th1 (=Vm). Then, when Vc exceeds Th1, the notifying unit 126 notifies the abnormality sign.

Comparative Example

Next, a comparative example will be described.

Figure 10:
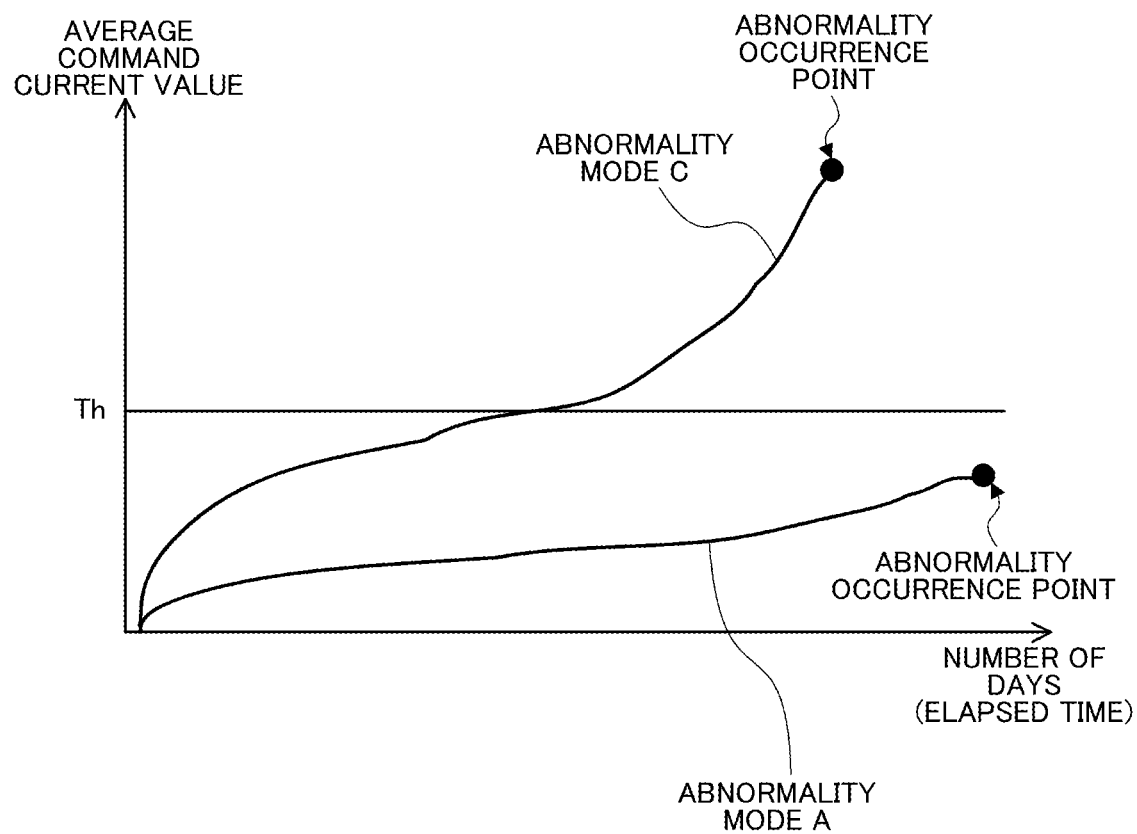
FIG. 10 is a view for describing a problem when an abnormality sign is notified using a predetermined threshold.
Figure 11:
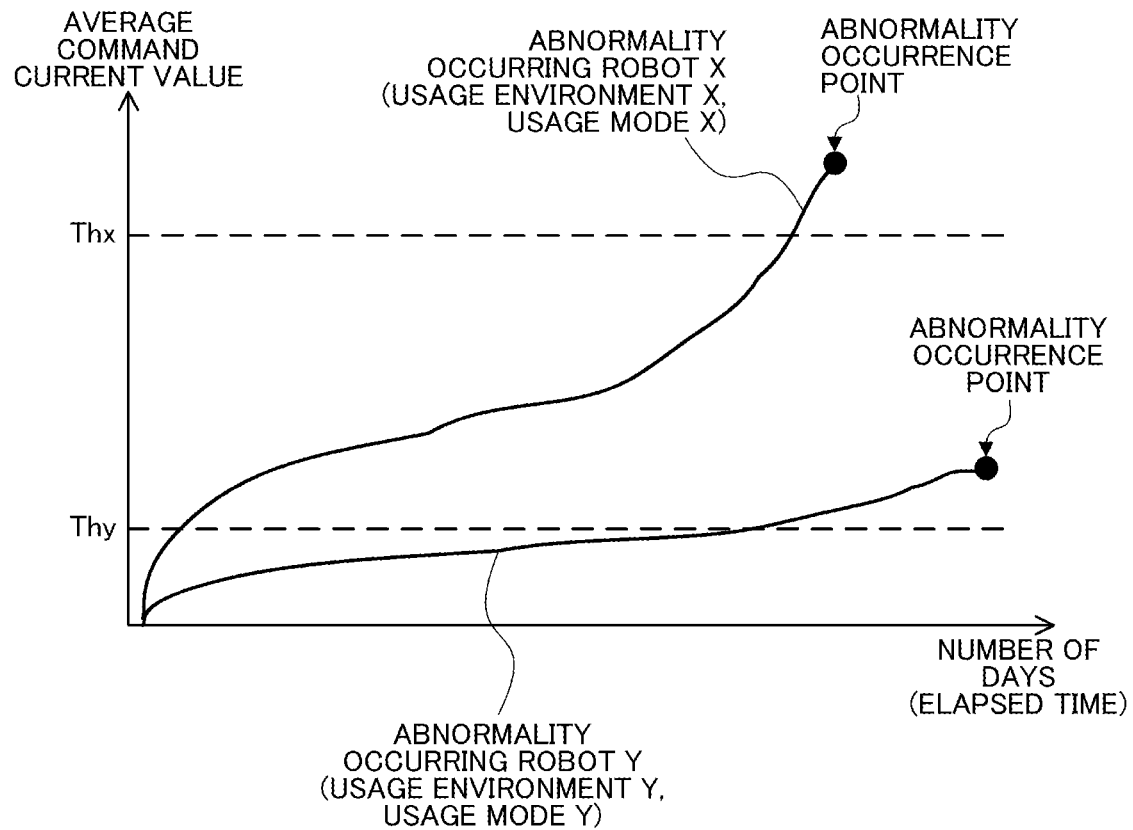
FIG. 11 is a view for describing a problem when an abnormality sign is notified using a predetermined threshold.

FIGS. 10 and 11 are views for describing a problem in notifying the abnormality sign using a predetermined threshold. FIG. 10 exemplifies a case where a predetermined threshold Th is set for the average command current value. In the example of FIG. 10, the threshold Th is determined as appropriate by the user based on the past abnormal occurrence history of the robot 10.

FIG. 10 shows a change of the average command current value of each of different abnormality modes (the abnormality modes A and C) over time, with the same model and part in which an abnormality has occurred. As shown in FIG. 10, the average command current value in the abnormality mode A changes more gradually than the average command current value in the abnormality mode C does. The threshold Th is larger than the value of the average command current value at the abnormality occurrence point in the abnormality mode A and is much smaller than the value of the average command current value at the abnormality occurrence point in the abnormality mode C.

In this case, when an abnormality of the abnormality mode A occurs in the robot 10, the abnormality may occur before the average command current value reaches the threshold Th. In such a case, an abnormality sign is not notified even though the abnormality has occurred. In other words, when the change in the operation state data over time is small as in the abnormality mode A, an abnormality sign may be "overlooked".

Moreover, when an abnormality of the abnormality mode C occurs in the robot 10, the average command current value may reach the threshold Th long before the abnormality occurs. In such a case, an abnormality sign is notified even though there is no abnormality sign. In other words, the notification of the abnormality sign is too early. That is, when the change in the operation state data over time is large as in the abnormality mode C, an "overdetection" of the abnormality sign may occur.

On the other hand, the abnormality sign notifying system 1 according to this embodiment automatically sets the threshold Th1 using the abnormality data having a high (strong) correlation with the current data. This effectively prevents the above-mentioned "overlooking" and the "overdetection" of the abnormality sign from occurring. Thus, the abnormality sign notifying system 1 according to this embodiment can notify the abnormality sign at a more appropriate timing.

FIG. 11 shows changes of the average command current values of an abnormality occurring robot X (usage environment X, usage mode X) and an abnormality occurring robot Y (usage environment Y, usage mode Y). The abnormality modes are the same while the usage environments differ from each other in the abnormality occurring robots X and Y and usage modes differ from each other in the abnormality occurring robots X and Y. As shown in FIG. 11, the average command current value of the abnormality occurring robot Y changes more gradually than the average command current value of the abnormality occurring robot X does.

Here, suppose that the abnormality data of the abnormality occurring robot X is extracted from the data storage unit 212, and a threshold Thx is set using the average command current value of the abnormality occurring robot X. In this case, an abnormality sign of the robot Y (usage environment Y, usage mode Y) which is different from the abnormality occurring robot X in its usage environment and usage mode is notified using this threshold Thx. At this time, an abnormality may occur before the average command current value reaches the threshold Thx. In such a case, the abnormality sign is not notified even though the abnormality has occurred. That is, when the threshold is set using the abnormality data of the abnormality occurring robot in which the operation state data changes a lot, the abnormality sign of the robot in which the operation state data changes a little may be "overlooked".

Moreover, suppose that the abnormality data of the abnormality occurring robot Y is extracted from the data storage unit 212, and a threshold Thy is set using the average command current value of the abnormality occurring robot Y. In this case, an abnormality sign of the robot X (usage environment X, usage mode X) which is different from the abnormality occurring robot Y in its usage environment and usage mode is notified using this threshold Thy. At this time, the average command current value may reach the threshold Thy long before an abnormality occurs. In such a case, an abnormality sign is notified even though there is no abnormality sign. In other words, the notification of the abnormality sign is too early. That is, when the threshold is set using the abnormality data of the abnormality occurring robot in which the operation state data changes a little, the abnormality sign of the robot in which the operation state data changes a lot may be "overdetected".

On the other hand, as described above, the abnormality sign notifying system 1 according to this embodiment narrows down the abnormality data used for setting the threshold Th1 based on the environmental information and the usage mode information related to the target robot and then sets the threshold. In other words, it is possible to select the abnormality data related to the environmental information and the usage mode information which are the same as or similar to the environmental information and the usage mode information related to the target robot. This effectively prevents the above-mentioned "overlooking" and the "over-detection" of the abnormality sign from occurring. This also enables the abnormality data used for setting the threshold to be more appropriately selected from among a huge number of the abnormality data pieces. Therefore, the abnormality sign notifying system 1 according to this embodiment makes it possible to notify the abnormality sign at a more appropriate timing.

Application Example of First Embodiment

Figure 12:
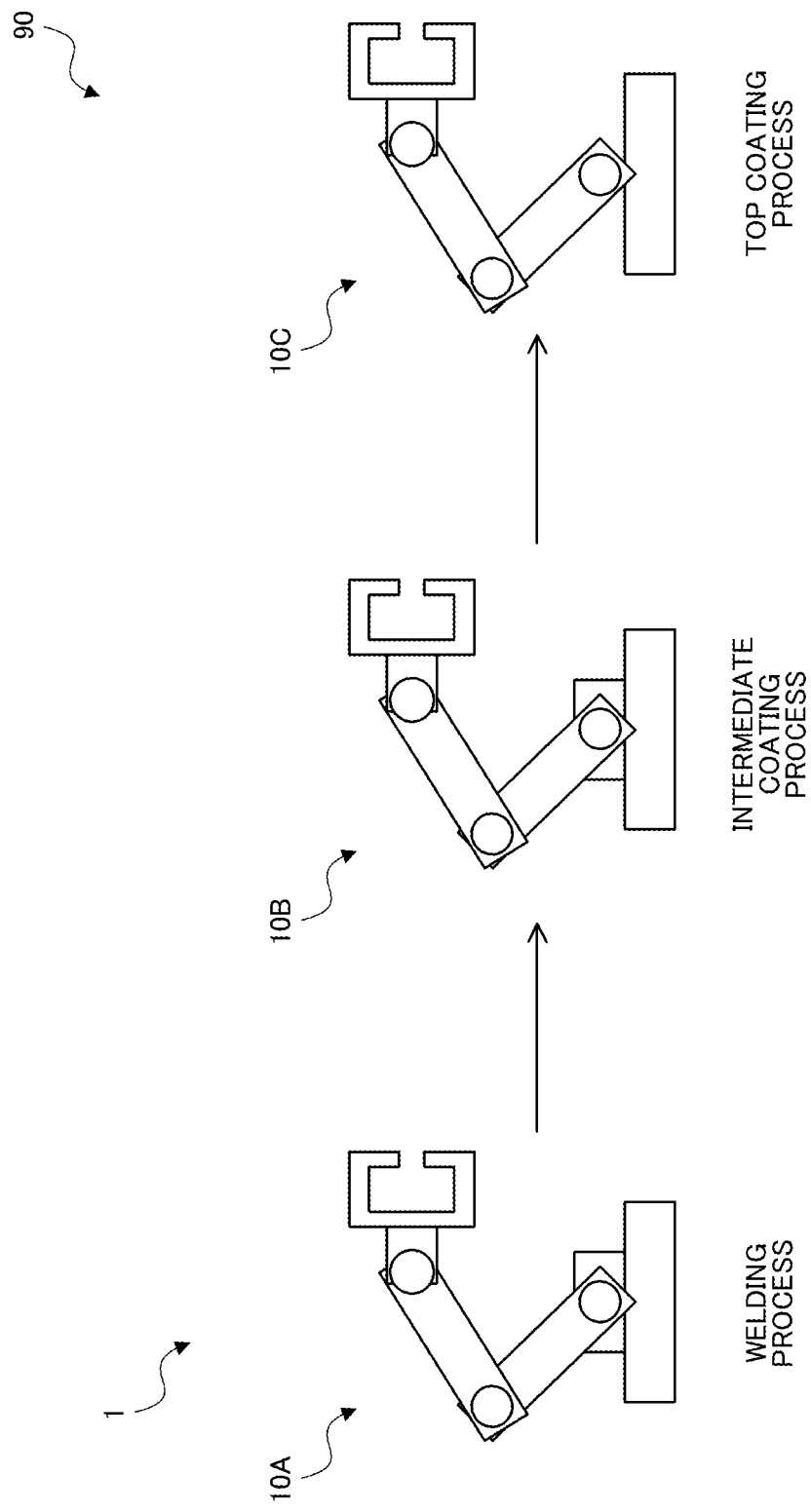
FIG. 12 is a view showing an example in which the abnormality sign notifying system according to the first embodiment is applied to a factory.
Figure 13:
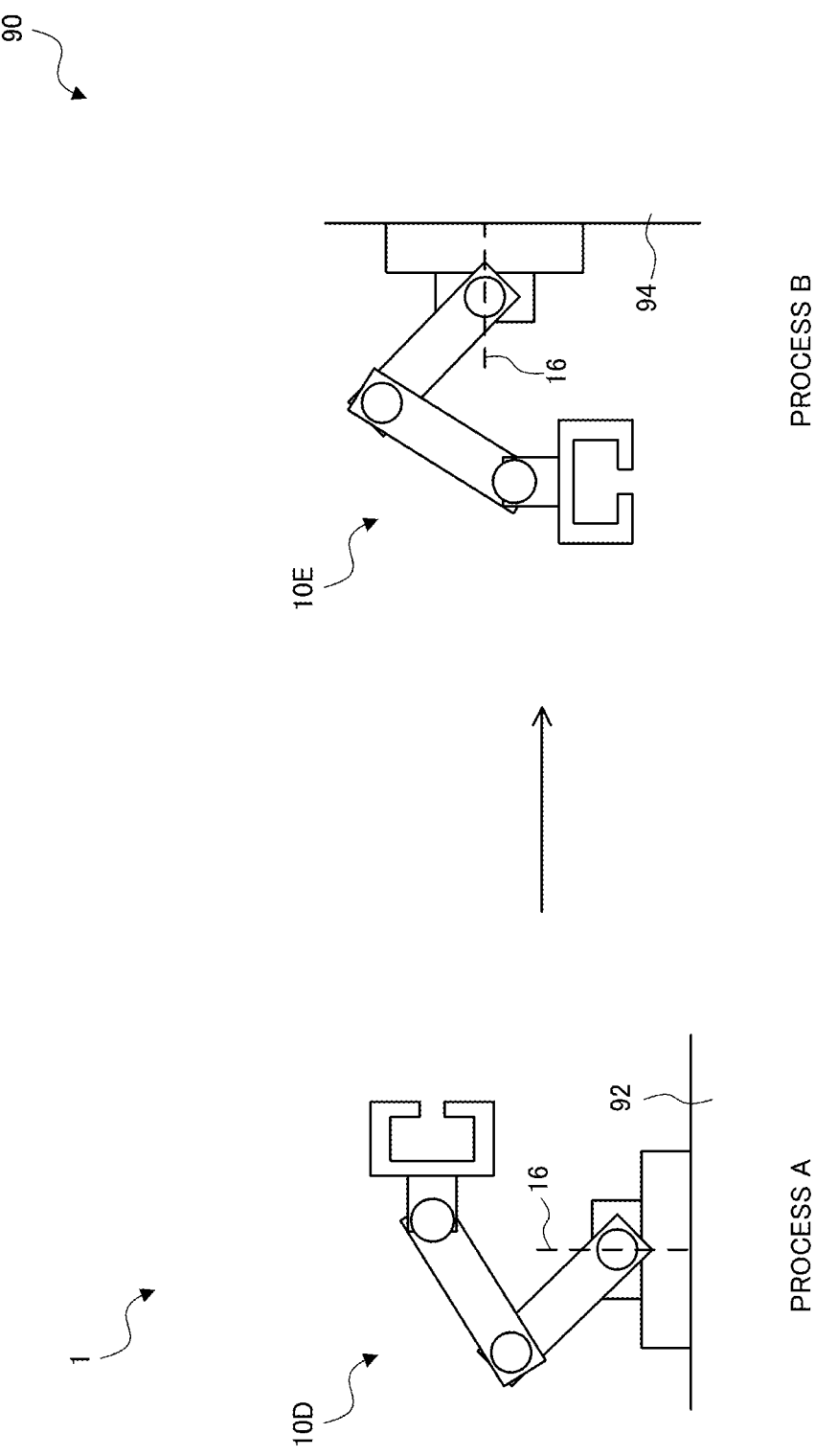
FIG. 13 is a view showing an example in which the abnormality sign notifying system according to the first embodiment is applied to a factory.

FIGS. 12 and 13 are views showing an example in which the abnormality sign notifying system 1 according to the first embodiment is applied to a factory 90. The factory 90 is, for example, a factory for manufacturing automobiles. As exemplified in FIG. 12, in the factory 90, a robot 10A is used in a welding process. A robot 10B is used in an intermediate coating process. A robot 10C is used in a top coating process. The models of the robot 10A, the robot 10B, and the robot 10C may be the same.

Further, as exemplified in FIG. 13, a robot 10D is used in a process A. The robot 10D is installed on a floor 92 of the factory 90. A robot 10E is used in a process B. The robot 10E is installed on a wall 94 of the factory 90. The models of the robot 10D and the robot 10E may be the same.

Figure 15:
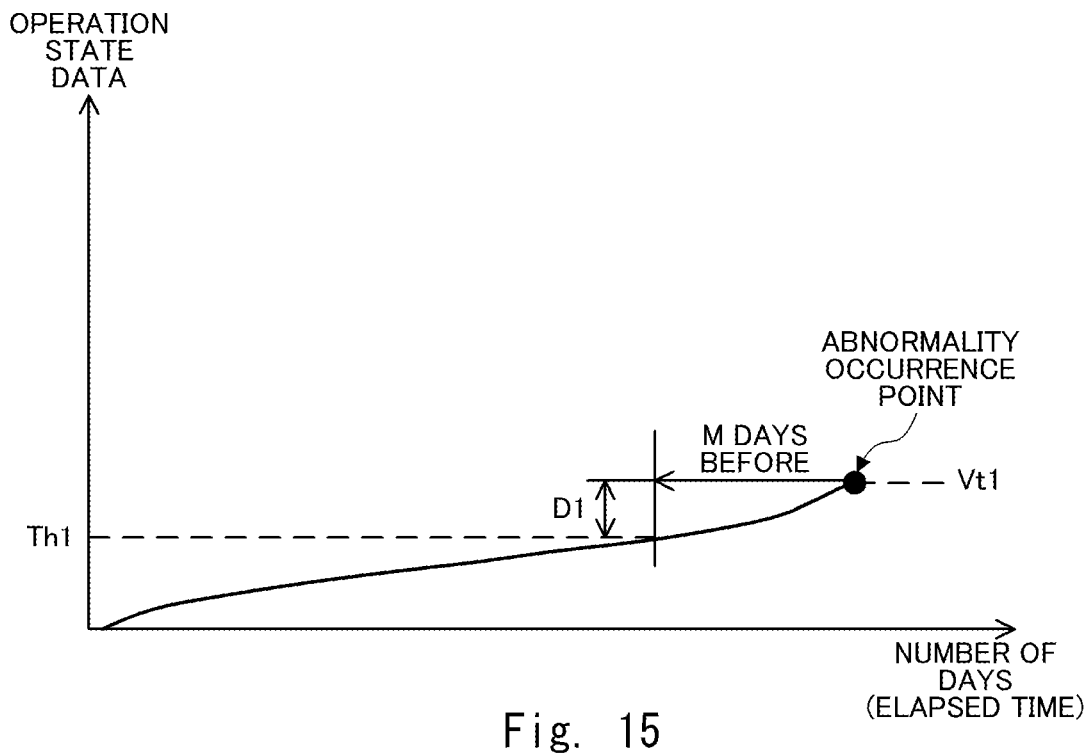
FIG. 15 is a view exemplifying different progress levels of abnormalities depending on a usage environment and a usage mode with the same model of the robots.
Figure 16:
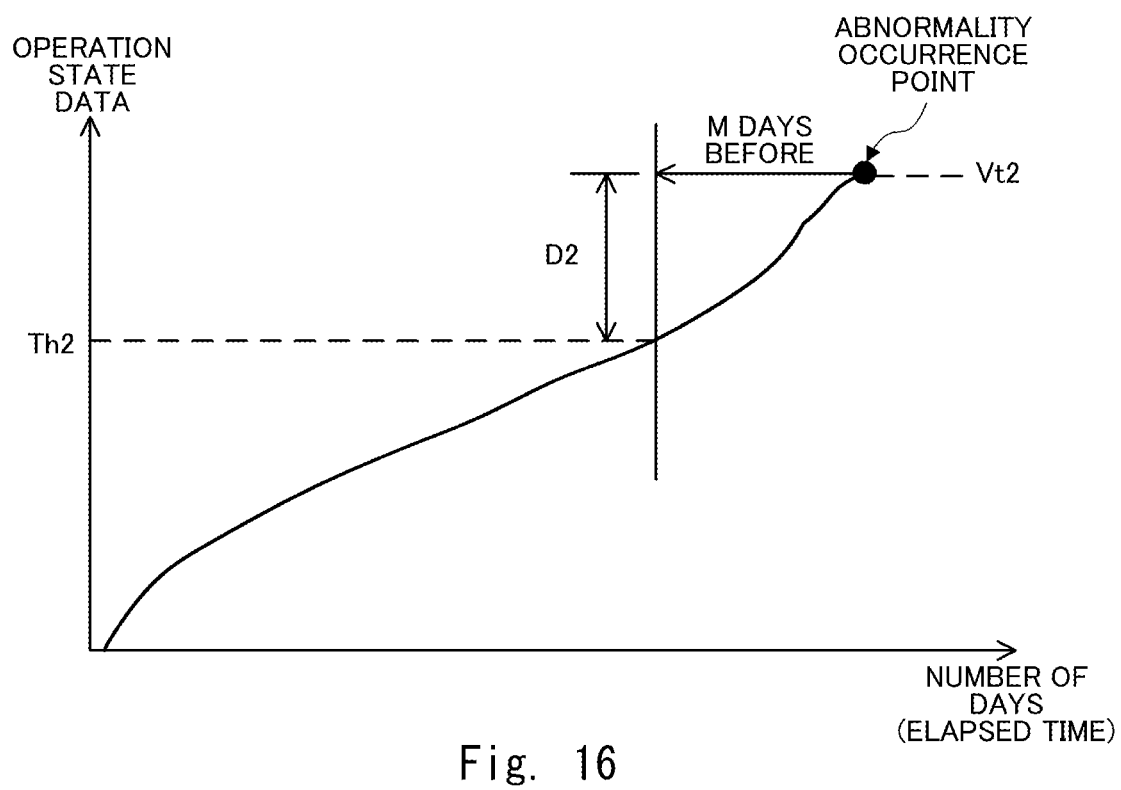
FIG. 16 is a view exemplifying different progress levels of abnormalities depending on a usage environment and a usage mode with the same model of the robots.

FIGS. 14 to 16 are views exemplifying different progress levels of abnormalities depending on the usage environment and the usage mode with the same model of the robots 10. FIG. 14 is a view showing an example of the usage environment and the usage mode. FIG. 15 is a view showing a change in the operation state data when the progress level of the abnormality is low (the abnormality progresses slowly (degradation progresses slowly)). FIG. 16 is a view showing a change in the operation state data when the progress level of the abnormality is high (the abnormality progresses quickly (degradation progresses fast)). Suppose that the abnormality mode in the example of FIG. 15 is the same as that in the example of FIG. 16 and the operation state data (e.g., the average command current value) in the example of FIG. 15 is the same as that in the example of FIG. 16. The "condition in which the abnormality is progressing" is a stage before an abnormality such as a failure occurs, and is the state in which the state of the robot 10 is approaching a state in which the abnormality occurs (the abnormality occurrence point).

Regarding the usage environment (temperature), when the temperature of the speed reducer 24 is, for example, less than 60 degrees, the characteristics of grease inside the speed reducer 24 do not change. In this case, as shown in FIG. 15, the progress level of the abnormality of the speed reducer 24 is low. On the other hand, when the temperature of the speed reducer 24 reaches, for example, 60 degrees or higher, the characteristics of the grease in the speed reducer 24 change. In this case, as shown in FIG. 16, the progress level of the abnormality of the speed reducer 24 increases.

Regarding the usage mode, the number of brake operations is small in the welding process such as the spot welding. Therefore, in the welding process, as shown in FIG. 15, the progress level of brake wearing-out is low. On the other hand, in the coating process (the intermediate coating process, the top coating process), the number of brake operations is large. Thus, as shown in FIG. 16, the progress level of brake wearing-out is high in the coating process.

In the top coating process, the number of reciprocating operations of the arm 12 and the like is small. Thus, the number of acceleration/deceleration operations is small. Hence, as shown in FIG. 15, the progress level of the bearing wearing-out of the speed reducer 24 is low in the top coating process. On the other hand, in the intermediate coating process, the number of reciprocating operations of the arm 12 and the like is large. Thus, the number of acceleration/deceleration operations is large. Hence, as shown in FIG. 16, the progress level of the bearing wearing-out of the speed reducer 24 is large in the intermediate coating process.

Moreover, as in the process A shown in FIG. 13, when the mounting direction of the robot 10 is on the floor, the load on a pivot shaft 16 for turning the arm 12 is small. For this reason, in the floor-mounted type, as shown in FIG. 15, the progress level of the abnormality of the speed reducer 24 of the pivot shaft 16 is low. That is, the lifetime of the speed reducer 24 of the pivot shaft 16 is long in the floor-mounted type. On the contrary, as in the process B shown in FIG. 13, when the mounting direction of the robot 10 is wall hanging, the load on the pivot shaft 16 of the arm 12 increases. For this reason, in the wall-hanging type, as shown in FIG. 16, the progress level of the abnormality of the speed reducer 24 of the pivot shaft 16 is high. That is, the lifetime of the speed reducer 24 of the pivot shaft 16 is short in the wall-hanging type.

Here, as shown in FIG. 15, when the progress level of the abnormality is low (the abnormality progresses slowly), the value of the operation state data M days before the abnormality occurrence point is set as the threshold Th1 used for notifying the abnormality sign. In this case, a difference between a value Vt1 of the operation state data at the abnormality occurrence point and the threshold Th1 is set as D1. Further, as shown in FIG. 16, when the progress level of the abnormality is high (the abnormality progresses quickly), the value of the operation state data M days before the abnormality occurrence point is set as a threshold Th2 used for notifying the abnormality sign. In this case, a difference between a value Vt2 of the operation state data at the abnormality occurrence point and the threshold Th2 is set as D2.

At this time, the difference D1 when the progress level of the abnormality is low shown in FIG. 15 is smaller than the difference D2 when the progress level of the abnormality is high shown in FIG. 16. Thus, the threshold is set as a value closer to the value at the abnormality occurrence point when the progress level of the abnormality is low rather than when the progress level of the abnormality is high. In other words, when the progress level of the abnormality is high, the threshold is set to a value distant from the value at the abnormality occurrence point. That is, when the value at the abnormality occurrence point is used as a reference, the threshold when the progress level is low (as compared with the value at the abnormality occurrence point) is large, while the threshold when the progress level of the abnormality is high (as compared with the value at the abnormality occurrence point) is small.

Accordingly, when the progress level of the abnormality is low, the abnormality sign is notified at the timing when the value of the operation state data approaches the value Vt1 at the abnormality occurrence point. As a result, when the progress level of the abnormality is low, the timing of notifying the abnormality sign is delayed with respect to the abnormality occurrence point. On the other hand, when the progress level of the abnormality is high, the abnormality sign is notified at the timing before the value of the operation state data approaches the value Vt2 at the abnormality occurrence point. As a result, when the progress level of the abnormality is high, the timing of notifying the abnormality sign becomes early with respect to the abnormality occurrence point.

Here, between a process (a first step) in which the temperature of the speed reducer 24 is lower than 60 degrees and a process (a second process) in which the temperature of the speed reducer 24 is equal to or higher than 60 degrees, suppose that the models of the robots 10 used are the same, and the abnormality mode of the abnormality occurring in the robots 10 is the same (e.g., bearing wearing-out due to grease degradation). In this case, the notifying unit 126 notifies the abnormality sign related to the robot 10 used in the process where the temperature of the speed reducer 24 reaches 60 degrees or higher at a timing earlier than the timing when it notifies the abnormality sign related to the robot 10 used in a process where the temperature of the speed reducer 24 is lower than 60.

Further, in the welding process (the first process) and the coating process (the second process), suppose that the models of the robots 10 used are the same, and the abnormality modes of the abnormality occurring in the robot 10 are the same (e.g., brake wearing-out). In this case, the notifying unit 126 notifies the abnormality sign related to the robot 10 used in the coating process at a timing earlier than the timing when it notifies abnormality sign related to the robot 10 used in the welding process.

Furthermore, in the top coating process (the first process) and the intermediate coating process (the second process), suppose that the models of the robots 10 used are the same and the abnormality modes of the abnormality occurring in the robot 10 are the same (e.g., the speed reducer Bearing wear, etc.). In this case, the notifying unit 126 notifies the abnormality sign related to the robot 10 used in the intermediate coating process at a timing earlier than the timing when it notifies the abnormality sign related to the robot 10 used in the top coating process.

In addition, in the process (the first process) where the mounting direction of the robot 10 is floor mounted and in the process (the second process) where the mounting direction of the robot 10 is wall hanging, suppose that the models of the robots 10 used are the same, and the abnormality mode of the abnormality occurring in the robots 10 are the same (e.g., an abnormality of the speed reducer of the pivot shaft). In this case, the notifying unit 126 notifies the abnormality sign related to the robot 10 used in the process where the mounting direction is wall hanging at a timing earlier than the timing when it notifies the abnormality sign related to the robot 10 used in the process where the mounting direction is floor mounted.

In this manner, the abnormality sign notifying system 1 according to this embodiment notifies the abnormality sign related to the robot 10 used in the processes (the above respective second processes) used under a more severe condition at an early timing. Therefore, the abnormality sign notifying system 1 according to this embodiment can notify the abnormality sign more reliably at the stage of the abnormality sign before an abnormality occurs even in a process used under a more severe condition.

Modified Example

Note that the present disclosure is not limited to the above-described embodiments, and can be appropriately changed without departing from the spirit of the present disclosure. For example, the order of the steps in the flowchart shown in FIG. 3 can be appropriately changed. One or more of the steps of the flowchart may be omitted. For example, in FIG. 3, the processing of S120 can be performed at any timing during S118 to S124. Further, the processing of S120 may be omitted.

Moreover, the abnormality sign notifying system 1 according to this embodiment notifies the abnormality sign related to the robot 10. However, an object, an abnormality sign of which is to be notified, is not limited to a robot. The abnormality sign notifying system 1 according to this embodiment can be applied to any device such as a specified processing apparatus other than the robot 10.

Further, in the abnormality sign notifying system 1 according to this embodiment, the control apparatus 100 and the monitoring apparatus 200 are physically separate apparatuses. However, the present disclosure is not limited to such a configuration. The control apparatus 100 and the monitoring apparatus 200 may be physically integrated. Furthermore, one or more components of the control apparatus 100 may be included in the monitoring apparatus 200. Likewise, one or more components of the monitoring apparatus 200 may be included in the control apparatus 100.

Further, the abnormality sign notifying system 1 according to this embodiment notify the sign of the abnormality occurring in the robot 10. However, the present disclosure is not limited to such a configuration. The abnormality sign notifying system 1 may notify a sign of an abnormality in the control apparatus 100 corresponding to the robot 10 and an abnormality in a signal line between the robot 10 and the control apparatus 100. That is, "abnormality in a device" includes not only an abnormality occurring in a processing apparatus such as the robot 10 but also an abnormality occurring in the control apparatus that controls the robot 10 and an abnormality occurring in the signal line connecting the robot 10 to the control apparatus.

The abnormality sign notifying system 1 according to the above-described embodiments is configured to determine the abnormality sign using the data for determination (the average command current value etc.) obtained by converting the measurement data (the command current value etc.). However, the present disclosure is not limited to such a configuration. The measurement data (raw data) itself may be used to determine the abnormality sign.

Further, in the abnormality sign notifying system 1 according to the above-described embodiments, in the processing of S110 of FIG. 3, the abnormality data related to the usage mode that is the "same" as the usage mode of the target robot is selected. However, the present disclosure is not limited to such a configuration. The usage modes may not be the same and instead may be similar. In this case, a priority may be set for each item of the usage mode (the robot model, the process, the mounting direction, etc.), and the abnormality data matching only the item with a high priority (e.g., the process) may be selected. Alternatively, points may be provided for each item of the usage mode, and when there is a matching item, the points may be added. Then, the abnormality data with high total points may be selected.

Moreover, the abnormality sign notifying system 1 according to the above-described embodiments determines the abnormality data having the largest correlation coefficient in the processing of S118 of FIG. 3. However, the present disclosure is not limited to such a configuration. For example, the abnormality data having the largest to the third largest correlation coefficients may be used for setting the timing of notifying the abnormality sign. That is, in the processing of S124, the threshold may be set for a plurality of pieces of the operation state data.

In the above-described embodiments, the "environmental information" is the ambient temperature at which the robot 10 is used. However, the present disclosure is not limited to such a configuration. For example, the "environmental information" may be ambient humidity or air cleanliness.

Additionally, the data storage unit 212 of the monitoring apparatus 200 according to the above embodiments stores the measurement data (raw data). However, the present disclosure is not limited to such a configuration. The data storage unit 212 of the monitoring apparatus 200 may store the data for determination. On the other hand, the data storage unit 212 stores the measurement data, so that the data for determination other than the exemplified data for determination (the average command current value etc.) can be generated by the monitoring apparatus 200 (the data processing unit 216) as appropriate. This is especially effective, for example, when the data for determination, which has not been expected when an abnormality occurs in some robot 10, is generated after a considerable period of time (e.g., a few years) since the abnormality has occurred in this robot 10.

Furthermore, the abnormality sign notifying system 1 according to the above-described embodiments does not need to store the abnormality data in a storage apparatus in the abnormality sign notifying system 1. The abnormality data may be stored in, for example, another server or cloud capable of communicating with the abnormality sign notifying system 1, and the abnormality data may be acquired from the server, the cloud, or the like. In this case, the data storage unit includes a function of storing the abnormality data (the operation state data of the robot 10 in which the abnormality has occurred) in the server, the cloud, or the like in association with the usage mode information and the environmental information.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An abnormality sign notifying system for notifying of an abnormality sign that is a sign of an abnormality occurrence in devices used in each of a plurality of processing processes in a factory including the plurality of processing processes, the abnormality sign notifying system comprising a processor configured to:
   notify of an abnormality sign related to a target device based on a sign of an abnormality occurrence of which is to be notified;
   obtain a number of brake operations of a first device performing a first process, among the plurality of processes; and
   obtain a number of brake operations of a second device performing a second process, among the plurality of processes, wherein
   the number of brake operations of the second device in the second process is greater than the number of brake operations of the first device in the first process, and
   in a case where models of the first device used in the first process and the second device used in the second process are the same, and an abnormality mode occurring in the first and second devices are the same in the first process and the second process, the processor is further configured to, based on the number of brake operations of the device in the second process being greater than the number of brake operations of the device in the first process, notify of an abnormality sign related to the second device used in the second process at a timing earlier than a timing at which an abnormality sign related to the first device used in the first process is notified.

2. The abnormality sign notifying system according to claim 1, wherein
   the processor is further configured to:
      acquire operation state data indicating a time-series operation state related to a plurality of devices comprising the first device and the second device;
      store a plurality of pieces of abnormality data corresponding to the operation state data of at least one device, among the plurality of devices, in which an abnormality occurred in the past in association with environmental information acquired by measuring an environment in which the device is used and usage mode information indicating a usage mode of the device;
      select target abnormality data by narrowing down the stored plurality of pieces of abnormality data to one or more pieces of the abnormality data by comparing the environmental information and usage mode information of a target device of which the abnormality sign is to be notified, among the plurality of devices, and environmental information and usage mode information corresponding to the stored plurality of pieces of abnormality data;
      set a timing for notifying of the abnormality sign based on the selected target abnormality data and the operation state data corresponding to the selected target abnormality data of the target device; and
      notify of the abnormality sign related to the target device at the timing set by the processor.

3. The abnormality sign notifying system according to claim 2, wherein the processor is further configured to:
   set a threshold related to the operation state data based on a correlation between the selected target abnormality data and the operation state data of the target device, and
   notify of the abnormality sign when the operation state data of the target device exceeds the threshold.

4. The abnormality sign notifying system according to claim 3, wherein the processor is further configured to:

determine at least one piece of the abnormality data for setting the threshold based on a correlation between a plurality of pieces of the operation state data of the target device and a plurality of pieces of the selected target abnormality data; and set, as the threshold, a value of the determined abnormality data a predetermined period before a time when an abnormality has occurred.

5. The abnormality sign notifying system according to claim 3, wherein the processor is further configured to:

associate an abnormality mode with each of the plurality of pieces of the abnormality data; and determine the abnormality mode that is predicted to occur in the target device based on the correlation between the operation state data of the target device and the selected target abnormality data.

6. The abnormality sign notifying system according to claim 2, wherein the plurality of devices operate in each of a plurality of processing processes in a factory including the plurality of processing processes.

7. The abnormality sign notifying system according to claim 2, wherein the comparing the environmental information of the target device and the environmental information of the stored plurality of pieces of abnormality data comprises determining a correlation between the environmental information of the target device and the environmental information of the stored plurality of pieces of abnormality data.

8. An abnormality sign notifying system for notifying of an abnormality sign that is a sign of an abnormality occurrence in devices used in each of a plurality of processing processes in a factory including the plurality of processing processes, the abnormality sign notifying system comprising a processor configured to:

notify of an abnormality sign related to a target device based on a sign of an abnormality occurrence of which is to be notified;

obtain a number of reciprocating operations of a first device performing a first process, among the plurality of processes; and obtain a number of reciprocating operations of a second device performing a second process, among the plurality of processes, wherein the number of reciprocating operations of the second device in the second process is greater than the number of reciprocating operations of the first device in the first process, and in a case where models of the first device used in the first process and the second device used in the second process are the same, and an abnormality mode occurring in the first and second devices are the same in the first process and the second process, the processor is further configured to, based on the number of reciprocating operations of the device in the second process being greater than the number of reciprocating operations of the device in the first process, notify of an abnormality sign related to the second device used in the second process at a timing earlier than a timing at which an abnormality sign related to the first device used in the first process is notified.

9. The abnormality sign notifying system according to claim 8, wherein the processor is further configured to:

acquire operation state data indicating a time-series operation state related to a plurality of devices comprising the first device and the second device;

store a plurality of pieces of abnormality data corresponding to the operation state data of at least one device, among the plurality of devices, in which an abnormality occurred in the past in association with environmental information acquired by measuring an environment in which the device is used and usage mode information indicating a usage mode of the device;

select target abnormality data by narrowing down the stored plurality of pieces of abnormality data to one or more pieces of the abnormality data by comparing the environmental information and usage mode information of a target device of which the abnormality sign is to be notified, among the plurality of devices, and environmental information and usage mode information corresponding to the stored plurality of pieces of abnormality data;

set a timing for notifying of the abnormality sign based on the selected target abnormality data and the operation state data corresponding to the selected target abnormality data of the target device; and notify of the abnormality sign related to the target device at the timing set by the processor.

10. The abnormality sign notifying system according to claim 9, wherein the processor is further configured to:

set a threshold related to the operation state data based on a correlation between the selected target abnormality data and the operation state data of the target device, and notify of the abnormality sign when the operation state data of the target device exceeds the threshold.

11. The abnormality sign notifying system according to claim 10, wherein the processor is further configured to:

determine at least one piece of the abnormality data for setting the threshold based on a correlation between a plurality of pieces of the operation state data of the target device and a plurality of pieces of the selected target abnormality data; and set, as the threshold, a value of the determined abnormality data a predetermined period before a time when an abnormality has occurred.

12. The abnormality sign notifying system according to claim 10, wherein the processor is further configured to:

associate an abnormality mode with each of the plurality of pieces of the abnormality data; and determine the abnormality mode that is predicted to occur in the target device based on the correlation between the operation state data of the target device and the selected target abnormality data.

13. The abnormality sign notifying system according to claim 9, wherein the plurality of devices operate in each of a plurality of processing processes in a factory including the plurality of processing processes.

14. The abnormality sign notifying system according to claim 9, wherein the comparing the environmental information of the target device and the environmental information of the stored plurality of pieces of abnormality data comprises determining a correlation between the environmental information of the target device and the environmental information of the stored plurality of pieces of abnormality data.

* * * * *